United States Patent
Chen et al.

(10) Patent No.: US 9,083,517 B2
(45) Date of Patent: Jul. 14, 2015

(54) METHOD AND APPARATUS FOR AGGREGATING CARRIERS OF A BACKHAUL CONNECTION

(75) Inventors: Wanshi Chen, San Diego, CA (US); Dexu Lin, San Diego, CA (US); Jelena M. Damnjanovic, Del Mar, CA (US); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 13/570,961

(22) Filed: Aug. 9, 2012

(65) Prior Publication Data

US 2013/0044654 A1 Feb. 21, 2013

Related U.S. Application Data

(60) Provisional application No. 61/524,704, filed on Aug. 17, 2011.

(51) Int. Cl.
*H04L 5/14* (2006.01)
*H04L 5/00* (2006.01)
(Continued)

(52) U.S. Cl.
CPC .............. *H04L 5/14* (2013.01); *H04L 1/1861* (2013.01); *H04L 5/001* (2013.01); *H04L 5/0023* (2013.01);
(Continued)

(58) Field of Classification Search
CPC   H04L 5/14; H04L 2012/5608; H04B 7/2606; H04B 7/2045; H04B 7/208; H04B 7/2123; H04B 7/212; H04W 88/04; H04W 16/26; H04W 84/047
USPC ......... 370/280, 315, 319, 321, 322, 324, 329, 370/330
See application file for complete search history.

(56) References Cited

U.S. PATENT DOCUMENTS 7,092,714 B2    8/2006    Noll et al.
8,675,585 B2    3/2014    Park et al.
(Continued)

FOREIGN PATENT DOCUMENTS

CN    102075307 A    5/2011
KR    2010-0118067    11/2010
(Continued)

OTHER PUBLICATIONS

Ericsson et al., "Operating principles of interband TDD CA with different UL-DL configurations", 3GPP Draft; R1-112079, 3rd Generation Partnership Project (3GPP), Mobile Competence Centre; 650, Route des Lucioles; F-06921 Sophia-Antipolis Cedex; France, vol. RAN WG1, No. Athens, Greece; 20110822, Aug. 16, 2011, XP050537267, sections 1, 2.1, 2.3.

(Continued)

*Primary Examiner* — Dady Chery
(74) *Attorney, Agent, or Firm* — Arent Fox LLP

(57) ABSTRACT

The described aspects include methods and apparatus for aggregating carriers over a backhaul link between a relay and an evolved Node B (eNB). A first set of subframes of at least a first carrier of a plurality of carriers configured for communicating with an eNB over a backhaul link can be determined. A second set of subframes of at least a second carrier of the plurality of carriers configured for backhaul link communications is also determined, wherein the second set of subframes are different from the first set of subframes. Data received over a plurality of access link carriers can then be communicated to the eNB over the first carrier and the second carrier based at least on the first set of subframes and the second set of subframes.

46 Claims, 14 Drawing Sheets

(51) Int. Cl.
*H04L 1/18* (2006.01)
*H04W 88/04* (2009.01)
*H04W 72/00* (2009.01)
*H04L 1/00* (2006.01)

(52) U.S. Cl.
CPC ............ *H04L 5/0055* (2013.01); *H04W 88/04* (2013.01); *H04L 5/0064* (2013.01); *H04L 5/0082* (2013.01); *H04L 5/0094* (2013.01); *H04L 2001/0097* (2013.01); *H04W 72/00* (2013.01)

(56) References Cited

U.S. PATENT DOCUMENTS

| | | | |
|---|---|---|---|
| 2010/0265913 A1 | 10/2010 | Gorokhov et al. | |
| 2011/0032879 A1 | 2/2011 | Beaudin et al. | |
| 2011/0128893 A1* | 6/2011 | Park et al. | 370/315 |
| 2012/0069790 A1 | 3/2012 | Chung et al. | |
| 2012/0069795 A1* | 3/2012 | Chung et al. | 370/315 |
| 2012/0082085 A1* | 4/2012 | Horiuchi et al. | 370/315 |
| 2012/0236783 A1* | 9/2012 | Park et al. | 370/315 |

FOREIGN PATENT DOCUMENTS

| | | |
|---|---|---|
| KR | 20110066108 A | 6/2011 |
| WO | 2010143867 A2 | 12/2010 |
| WO | WO-2010/150517 A1 | 12/2010 |
| WO | 2011025340 A2 | 3/2011 |
| WO | 2011051921 A2 | 5/2011 |
| WO | 2011052964 A2 | 5/2011 |
| WO | WO-2011/071337 A2 | 6/2011 |

OTHER PUBLICATIONS

Intel Corporation: Support of Mixed Inter-Band TDD Configurations in Rel -11 CAM, 3GPP Draft; R2-113216 Mixed TDD Configurations for Interband CA, 3rd Generation Partnership Project (3GPP), Mobile Competence Centre; 650, Route des Lucioles; F-06921 Sophia-Antipolis Cedex; France, vol. RAN WG2, No. Barcelona, Spain; 20110509, May 3, 2011, XP050495383, [retrieved on 2011-05-03] the whole document.

International Search Report and Written Opinion—PCT/US2012/050329—ISA/EPO—Apr. 11, 2013.

LG Electronics Inc: "Backhaul Subframe Allocation Considering HARQ Timeline", 3GPP Draft; R1-102424 Backhaul Subframe Allocation LGE, 3rd Generation Partnership Project (3GPP), Mobile Competence Centre; 650, Route des Lucioles, F-06921 Sophia-Antipolis Cedex; France, vol. RAN WG1, No. Beijing, China; 20100412, Apr. 6, 2010, XP050419636.

NTT Docomo: "Combination of Carrier Aggregation and Relay in Rel-10", 3GPP Draft; R1-110243 Relay+CA, 3rd Generation Partnership Project (3GPP), Mobile Competence Centre; 650, Route des Lucioles; F-06921 Sophia-Antipolis Cedex; France, vol. RAN WG1, No. Dublin, Ireland; 20110117; Jan. 11, 2011, XP050490150, sections 1, 2; figure 1.

Partial International Search Report—PCT/US2012/050329—ISA/EPO—Jan. 30, 2013.

Yuan, et al., "Relay Backhaul Subframe Allocation in LTE-Advanced for TDD," Proceedings from ICST '10: The 5th International ICST Conference on Communications and Networking in China (Chinacom), pp. 1-5.

Zheng K., et al., "Interference coordination for OFDM-based multihop LTE-advanced networks", IEEE Wireless Communications, IEEE Service Center, Piscataway, NJ, US, vol. 18, No. 1, Feb. 1, 2011, pp. 54-63, XP011349797, ISSN: 1536-1284, DOI: 10.1109/MWC.2011.5714026 abstract; figure 1 p. 56.

Panasonic: Capturing of agreements on relaying from RAN1 #64 [online], 3GPP TSG-RAN WG1#64 R1-111217, Url:http://www.3gpp.org/ftp/tsg_ran/VVG1_RL1/TSGR1_64/Docs/R1-111217.zip>, Feb. 21-Feb. 25, 2011.

Pantech: Views on support of different TDD configuration in Rel-11 [online], 3GPP TSG-RAN WG1#66 R1-112280, <URL:http://www.3gpp.org/ftp/tsg_ran/WG1_RL1/TSGR1_66/Docs/R1-112280.zip>, Aug. 22-Aug. 26, 2011.

Potevio: Support of different TDD UL-DL configurations on different bands [online], 3GPP TSG-RAN WG1#66 R1-112579, <URL:http://www.3gpp.org/ftp/tsp_ran/WG1_RL1/TSGR1_66/Docs/R1-112579.zip>, Aug. 22-Aug. 26, 2011.

\* cited by examiner

METHOD AND APPARATUS FOR AGGREGATING CARRIERS OF A BACKHAUL CONNECTION

CLAIM OF PRIORITY UNDER 35 U.S.C. §119

The present application for patent claims priority to Provisional Application No. 61/524,704, entitled METHOD AND APPARATUS FOR AGGREGATING CARRIERS OF A BACKHAUL CONNECTION, filed Aug. 17, 2011, assigned to the assignee hereof and hereby expressly incorporated by reference herein.

BACKGROUND

1. Field

The following description relates generally to wireless network communications, and more particularly to relay node communications.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile user equipment (UE). Each UE may communicate with one or more evolved Node B (eNB) via transmissions on forward and reverse links. The forward link (or downlink) refers to the communication link from eNB to UE, and the reverse link (or uplink) refers to the communication link from UE to eNB. Further, communications between UE and eNB may be established via single-input single-output (SISO) systems, multiple-input single-output (MISO) systems, multiple-input multiple-output (MIMO) systems, and so forth.

In addition, carriers for communicating with one or more eNBs can be aggregated at a UE to provide increased throughput, additional functionality over the carriers, and/or the like. Moreover, a UE can communicate with the one or more eNBs through one or more relay nodes, which communicate with the one or more eNBs over a backhaul link. Relay nodes, for example, can extend coverage of the one or more base stations, increase throughput for communicating with the one or more base stations, etc. by virtue of retransmitting signals to/from the one or more eNBs. For example, a relay can operate in a half duplex mode where the relay can either receive or retransmit (but not both) in a given period of time, or in a full duplex mode where the relay can receive and retransmit at any given time.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with providing carrier aggregation (CA) over a backhaul connection at a relay node. CA over a backhaul link with an evolved Node B (eNB) allows a user equipment (UE) to communicate over multiple independent carriers via the relay node. Where the relay node is half duplex, and backhaul carriers can be of different configurations, the relay node can at least one of ensure the carrier configurations are compatible, or implement scheduling restrictions or other logic where the carrier configurations are not compatible. In another example, the relay node can use frequency division multiplexing (FDM) to provide full duplex communications; thus, carriers can be of substantially any configuration.

In one example, a method for aggregating carriers over a backhaul link is provided. The method includes determining a first set of subframes of at least a first carrier of a plurality of carriers configured for communicating with an eNB over a backhaul link and determining a second set of subframes of at least a second carrier of the plurality of carriers configured for backhaul link communications, wherein the second set of subframes are different from the first set of subframes. The method further includes communicating data received over a plurality of access link carriers to the eNB over the first carrier and the second carrier based at least on the first set of subframes and the second set of subframes.

In another aspect, an apparatus for aggregating carriers over a backhaul link is provided. The apparatus includes means for determining a first set of subframes of at least a first carrier of a plurality of carriers configured for communicating with an eNB over a backhaul link, and determining a second set of subframes of at least a second carrier of the plurality of carriers, wherein the second set of subframes are different from the first set of subframes. The apparatus further includes means for communicating data received over a plurality of access link carriers to the eNB over the first carrier and the second carrier based at least on the first set of subframes and the second set of subframes.

Still, in another aspect, a computer program product is provided including a computer-readable medium having code for causing a computer to determine a first set of subframes of at least a first carrier of a plurality of carriers configured for communicating with an eNB over a backhaul link and code for causing the computer to determine a second set of subframes of at least a second carrier of the plurality of carriers configured for backhaul link communications, wherein the second set of subframes are different from the first set of subframes. The computer-readable medium further includes code for causing the computer to communicate data received over a plurality of access link carriers to the eNB over the first carrier and the second carrier based at least on the first set of subframes and the second set of subframes.

In yet another aspect, a wireless communication device for aggregating carriers over a backhaul link is provided including a processor and a memory in electronic communication with the processor. The wireless communication device further includes instructions stored in the memory executable by the processor to determine a first set of subframes of at least a first carrier of a plurality of carriers configured for communicating with an eNB over a backhaul link, determine a second set of subframes of at least a second carrier of the plurality of carriers configured for backhaul link communications, wherein the second set of subframes are different from the first set of subframes, and communicate data received over a plurality of access link carriers to the eNB over the first carrier and the second carrier based at least on the first set of subframes and the second set of subframes.

Moreover, in an aspect, an apparatus for aggregating carriers over a backhaul link is provided. The apparatus includes a carrier assignment receiving component for determining a first set of subframes of at least a first carrier of a plurality of carriers configured for communicating with an evolved node B (eNB) over a backhaul link, and determining a second set of subframes of at least a second carrier of the plurality of carriers, wherein the second set of subframes are different from the first set of subframes, and a backhaul link component for communicating data received over a plurality of access link carriers to the eNB over the first carrier and the second carrier based at least on the first set of subframes and the second set of subframes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
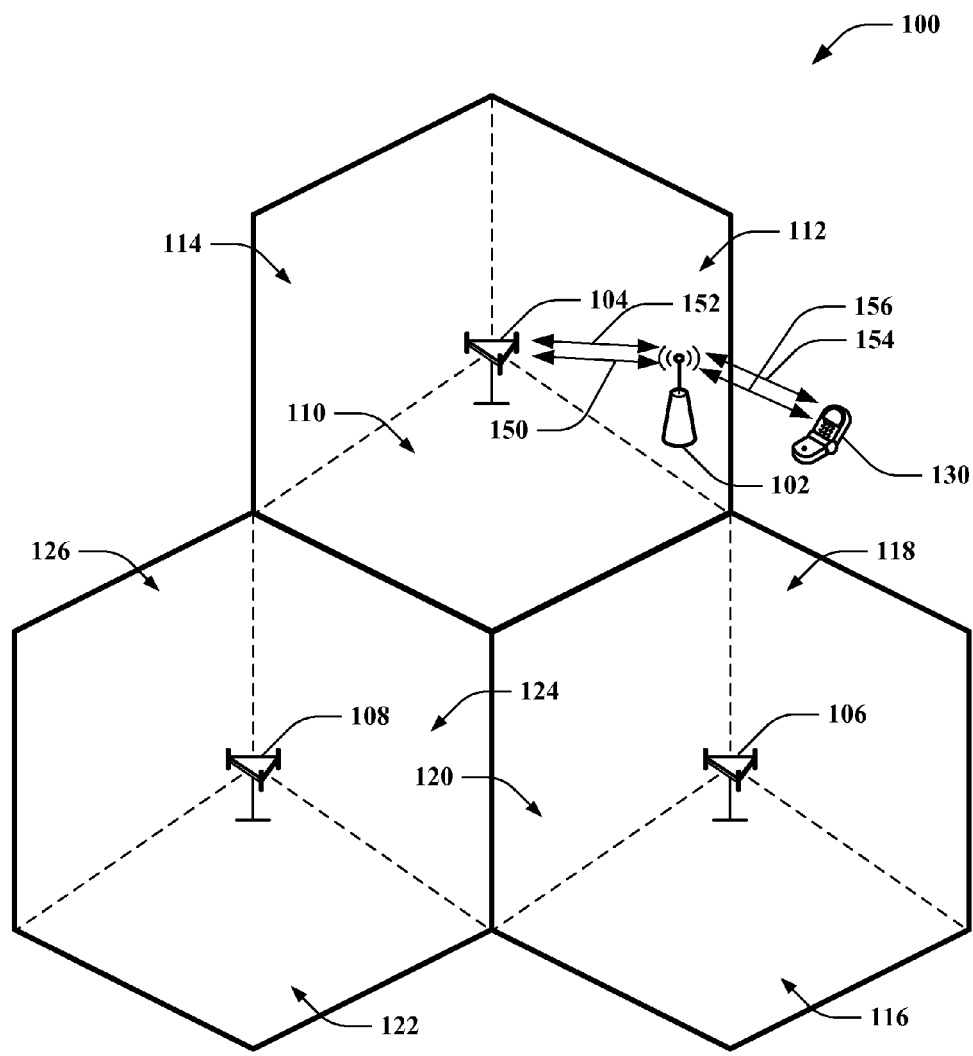
FIG. 1 illustrates an example system of a relay communicating over multiple aggregated carriers.
Figure 1:
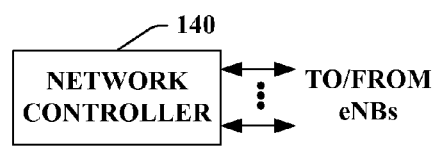

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to providing carrier aggregation (CA) for a relay backhaul link. For example, a relay (also referred to herein as "relay node") can communicate with one or more evolved Node Bs (eNB), relays, or other nodes over one or more aggregated carriers. This can improve backhaul link communications between the relay and the other node in view of the available CA. The relay can also communicate in half duplex mode (e.g., the relay at any given point in time can receive or retransmit, but not both) or full duplex mode (e.g., the relay can receive and/or retransmit in any given point in time). In one example, the one or more aggregated carriers can employ different configurations to provide more efficient backhaul communications, and the relay can operate based on the different configurations.

For example, the different configurations can correspond to different defined subframe configurations of the carriers. In this example, where the relay is operating in half duplex mode, aggregated carriers used by the relay can be restricted to certain compatible subframe configurations to ensure that at a given point in time, the relay is either communicating over backhaul link or the access link, and/or is using either uplink or downlink resources. In another example, the different non-compatible subframe configurations can be used across the carriers in half duplex mode, subject to scheduling restrictions or other mechanisms to mitigate collision. Moreover, the relay can utilize frequency division multiplexing (FDM), or other multiplexing technology, to communicate in full duplex mode, such that aggregated carriers can use different compatible or non-compatible subframe configurations.

As used in this application, the terms "component," "module," "system" and the like are intended to include a computer-related entity, such as but not limited to hardware, software/firmware, a combination of hardware and software/firmware, or software/firmware in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example wireless communication system 100 for aggregating carriers for communicating via a relay node. System 100 includes a relay 102 that retransmits signals to/from one or more cells of one or more eNBs 104, 106, and 108 in a multicarrier configuration. For example, the multicarrier configuration can relate to aggregating carriers of a plurality of eNBs or related cells, as described herein, for simultaneously retransmitting the same or different data. In the depicted example, eNB 104 provides multiple cells 110, 112, and 114, eNB 106 provides multiple cells 116, 118, and 120, and eNB 108 provides multiple cells 122, 124, and 126. Though shown substantially as macro node coverage, it is to be appreciated that system 100 can include one or more femto nodes, pico nodes, etc., for or to which relay 102 can retransmit signals. System 100 also includes a UE 130 that is served at least by relay 102. In addition, system 100 includes a network controller 140 that can facilitate communication between the eNBs 104, 106, and 108, and one or more other components, such as components of a core wireless network.

Relay 102 can be a node that receives a transmission of data and/or other information from a node (e.g., an eNB 104 or a UE 130) and sends a transmission of the data and/or other information to another node (e.g., a UE 130 or an eNB 104). Relay 102 can also be a UE that relays transmissions of eNB 104 for other UEs 130. As depicted, relay 102 can establish a backhaul link with eNB 104 over multiple aggregated carriers 150 and 152. Though shown in a single cell with a single eNB, it is to be appreciated that relay 102 can establish carriers 150 and 152 in separate cells and/or with separate eNBs. Relay 102 also provides an access link of multiple aggregated carriers 154 and 156 for communicating with UE 130 and/or other UEs. In an example, relay 102 associates carrier 154 with carrier 150, and carrier 156 with carrier 152 for retransmitting communications between eNB 104 and UE 130.

Relay 102 can communicate in half duplex or full duplex mode, as described. In an example, when communicating in half duplex mode, relay 102 can utilize carriers 150 and 152 for CA in communicating with eNB 104 where the carriers 150 and 152 are compatible. In one example, compatible carriers can include carriers having compatible subframe configurations. The subframe configuration of a relay can refer to which subframes in a collection of subframes are configured for downlink communication and/or which subframes are configured for uplink communication. Compatible subframe configurations exist where the subframe configuration of one carrier indicates downlink communications in subframes that compose a subset of subframes indicated for downlink communications in another subframe configuration of another carrier. In a symmetric configuration, where the subframe has the same number of uplink and downlink carriers, it can follow that the one carrier indicates uplink communications in subframes that compose a subset of subframes indicated for uplink communications in the other subframe configuration of the other carrier. Thus, for half duplex mode, using compatible carriers ensures the relay 102 is either receiving from eNB 102 over the downlink or retransmitting to the eNB 104 (but not both) in a given subframe. It is to be appreciated, however, that relay 102 can use carriers 150 and 152 regardless of subframe configuration with additional restrictive mechanisms described further herein.

In another example, relay 102 can operate in full duplex mode, such that it can receive and transmit at any point in time. In this example, relay 102 can use carriers 150 and 152 regardless of whether the carriers are compatible. Some restriction, however, can be implemented for selecting carriers 154 and 156 to mitigate interference between carriers 150 and 152, and carriers 154 and 156 at relay 102.

Figure 2:
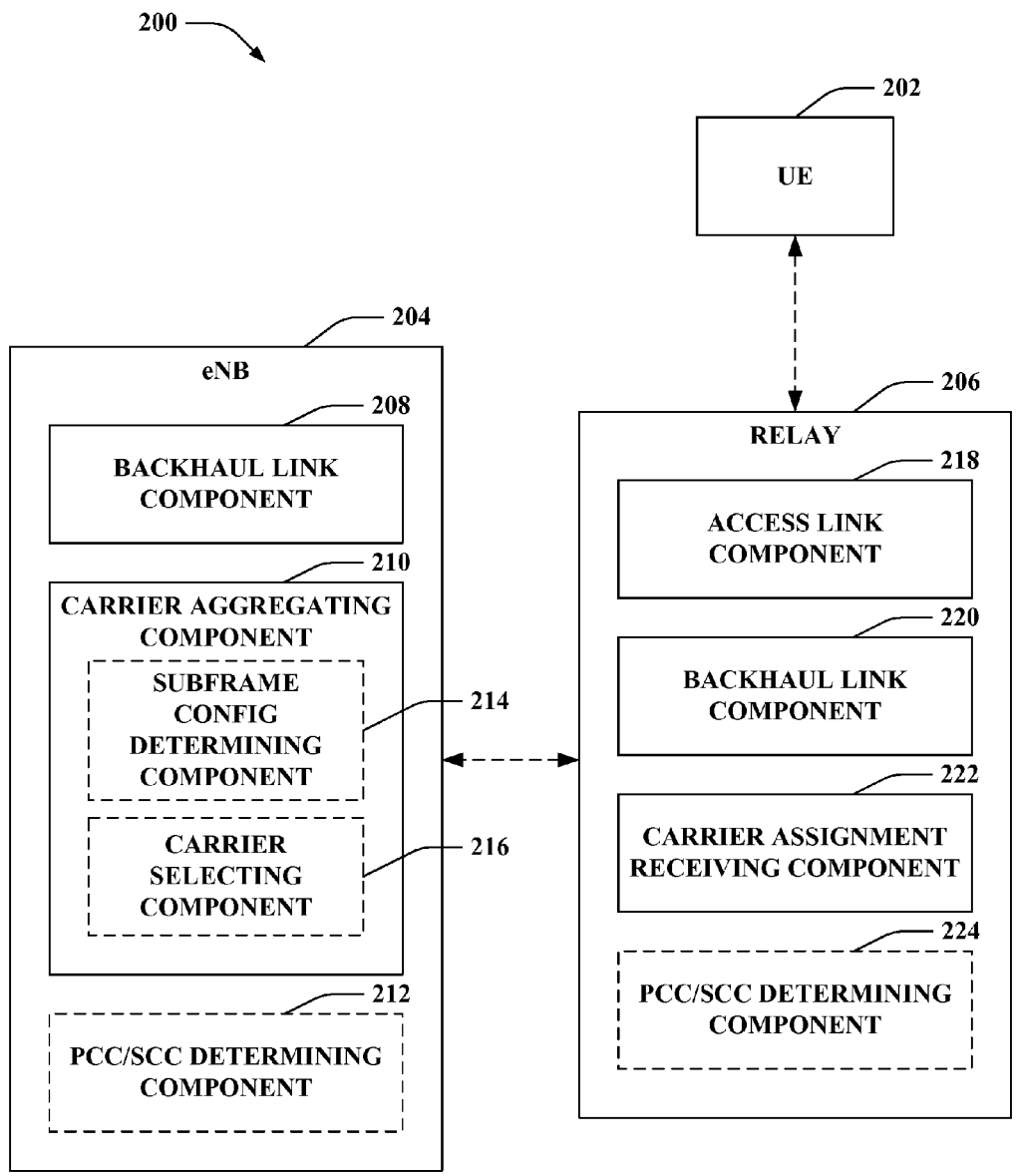
FIG. 2 illustrates an example system for aggregating carriers for backhaul communications with a relay.

Referring to FIG. 2, an example wireless communication system 200 that facilitates aggregating carriers for backhaul communication is illustrated. System 200 comprises a UE 202 that communicates with an eNB 204 via a relay 206. For example, UE 202 can communicate with relay 206 over an access link, and relay 206 can forward communications to/from eNB 204 over a backhaul link. As described, UE 202 can communicate over multiple aggregated carriers in some networks, and eNB 204 can thus assign multiple aggregated carriers to the UE 202. In this regard, relay 206 can be configured to support communications over multiple aggregated carriers on the access link with UE 202 as well as the backhaul link with eNB 204. UE 202 can be an independently powered device, a tethered device (such as a modem), a mobile device, a stationary device, a portion thereof, and/or the like. eNB 204 can be a macro node, femto node, pico node, micro node, or similar access point, another relay, a mobile base station, a UE (e.g., communicating in peer-to-peer or ad-hoc mode), a portion thereof, and/or the like. Moreover, relay 206 can be a wireless relay node, a UE relay (e.g., a UE that operates as a relay using an access link with eNB 204 as a backhaul link and supporting communications from other UEs), and/or the like.

eNB 204 can include a backhaul link component 208 for communicating with one or more relays over a backhaul link thereto, a carrier aggregating component 210 for aggregating multiple carriers for assigning to the one or more relays, and an optional primary component carrier (PCC)/secondary component carrier (SCC) determining component 212 for selecting one of the multiple aggregated carriers as a PCC—for communicating control data with the relay—or an SCC. In addition, carrier aggregating component 210 can optionally include a subframe configuration determining component 214 for discerning a subframe configuration of one or more carriers, and/or a carrier selecting component 216 for determining a carrier to assign to the relay based on one or more parameters.

Relay 206 includes an access link component 218 for communicating with one or more UEs over an access link (and/or establishing multiple carriers for such communicating), and a backhaul link component 220 for communicating with one or more eNBs (and/or establishing multiple carriers for such communicating), as described. Relay 206 can also include a carrier assignment receiving component 222 for obtaining a plurality of carrier assignments from an eNB, and an optional PCC/SCC determining component 224 for discerning a PCC and/or SCC of the plurality of assigned carriers.

According to an example, UE 202 can communicate with eNB 204 via relay 206 by establishing one or more carriers over an access link with relay 206, which can establish one or more carriers over a backhaul link with eNB 204. In one example, carrier aggregating component 210 can assign an initial carrier to relay 206, and backhaul link components 208 and 220 can communicate over the carrier. In addition, carrier aggregating component 210 can assign one or more additional carriers to relay 206 to facilitate carrier aggregation over the backhaul link. As described, this can improve throughput over the backhaul link—e.g., especially where UE 202 and eNB 204 also support carrier aggregation.

For example, carrier aggregating component 210 can select or generate the one or more additional carriers and/or related parameters for assigning to the relay 206. Though referred to herein as an initial carrier and one or more additional carriers, the carriers can be configured at similar times and/or as part of the same carrier configuration procedure. In some examples, selection or generation of the one or more additional carriers can be restricted based on parameters of the initial carrier or otherwise. In one example, subframe configuration determining component 214 can determine a subframe configuration of the initial carrier, and carrier selecting component 216 can select the one or more additional carriers to be a compatible carrier (e.g., have compatible subframe configurations). For example, the subframe configuration of the one or more additional carriers can specify a set of subframes for downlink communication that are a subset of subframes specified for downlink communication in a subframe configuration of the initial carrier, as described. Alternatively, carrier selecting component 216 can select the one or more additional carriers to have a subframe configuration specifying downlink communication subframes of which the downlink communication subframes of the subframe configuration for the initial carrier are a subset. It is to be appreciated the selection of the carrier can similarly relate to uplink subframes.

In any case, the carriers have some common subframes to allow relay 206 to operate in half duplex mode, transmitting over all of the multiple carriers or receiving over the carriers in a given subframe, which can simplify backhaul link communications. Moreover, because multiple carriers can be used for the backhaul link, throughput can be increased for communication between relay 206 and eNB 204. In addition, feedback for the aggregated carriers in a given subframe can be more easily mapped to a subsequent subframe where the subframe configurations are compatible. This can be because the subframe configurations have at least one or more common subframes for downlink (or uplink) communications, and can thus have the same subsequent feedback subframes (e.g., 4 milliseconds (ms) from the communication subframe in LTE FDD, or another subsequent uplink or downlink subframe in LTE TDD (time division duplex)).

In one specific example, in LTE FDD, a backhaul subframe can have a periodicity of 8 ms, and thus, with 1 ms subframes, $2^8-1=255$ subframe configurations are possible where one or more of the subframes are used for downlink transmissions. In this example, subframe configuration determining component 214 can represent subframe configurations for multiple possible carriers as an 8-bit bitmap, where an active bit (a bit set to 1) indicates a downlink subframe. Where active bits related to the one or more additional carriers are a subset of active bits related to the initial carrier (and/or vice versa), the carriers are compatible, and carrier selecting component 216 can select the carriers for aggregating in the backhaul link with relay 206. It is to be appreciated that a carrier configured for backhaul communications by carrier selecting component 216 can have the same number of downlink and uplink subframes, a larger number of downlink subframes, etc.

In another specific example, in LTE TDD, a backhaul subframe can have one of a plurality of configurations of 10 subframes, such as shown in the table below.

| SubframeConfigurationTDD | eNB-RN uplink-downlink configuration | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | | | | | D | | | | U | |
| 1 | | | | U | | | | | | | D |
| 2 | | | | | | D | | | | U | D |
| 3 | | | | | U | D | | | | | D |
| 4 | | | | | U | D | | | | U | D |
| 5 | 2 | | | U | | | | | | D | |
| 6 | | | | | D | | | U | | | |
| 7 | | | | U | | D | | | | D | |
| 8 | | | | | D | | | | | U | D |
| 9 | | | | U | D | D | | | | D | |
| 10 | | | | | D | | | | U | D | D |
| 11 | 3 | | | U | | | | | D | | D |
| 12 | | | | U | | | | | D | D | D |
| 13 | 4 | | | U | | | | | | | D |
| 14 | | | | U | | | | | D | | D |
| 15 | | | | U | | | | | | D | D |
| 16 | | | | U | | | | | D | D | D |
| 17 | | | | U | D | | | | D | D | D |
| 18 | 6 | | | | | U | | | | | D | where the SubframeConfigurationTDD is an index, the U and D represent respective subframes that are allocated for uplink and downlink transmissions over the backhaul link, and the blank subframes are not utilized for communication in a given subframe configuration. In this example, subframe configuration determining component 214 can similarly determine compatible carriers based on the possible subframe configurations. In another example, subframe configuration determining component 214 can be configured with one or more parameters defining such compatible carriers. For example, subframe configuration determining component 214 can be configured with a table or other bitmap corresponding to the table below specifying compatible subframe configurations for determining compatible carriers.

| Configuration {eNB-RN uplink-downlink configuration, Subframe ConfigurationTDD} | Compatible (different) Configs {eNB-RN uplink-downlink configuration, Subframe ConfigurationTDD} | Compatible TDD UL/DL configuration |
|---|---|---|
| {1, 0} | {1, 2}, {1, 4} | 1 |
| {1, 1} or (4, 13) | {1, 3}, {1, 4}, (3, 11), {3, 12}, {4, 13}, {4, 14}, {4, 15}, {4, 16}, {4, 17} | 1, 3 and 4 |
| {1, 2} | {1, 0}, {1, 4} | 1 |
| {1, 3} | {1, 1}, {1, 4}, {4, 17} | 1, 4 |
| {1, 4} | {1, 0}, {1, 1}, {1, 2}, | 1, 4 |

-continued

| Configuration {eNB-RN uplink-downlink configuration, Subframe ConfigurationTDD} | Compatible (different) Configs {eNB-RN uplink-downlink configuration, Subframe ConfigurationTDD} | Compatible TDD UL/DL configuration |
|---|---|---|
| | {1, 3}, {4, 13} | |
| {2, 5} | {2, 7}, {2, 9} | 2 |
| {2, 6} | {2, 8}, {2, 10} | 2 |
| {2, 7} | {2, 5}, {2, 9} | 2 |
| {2, 8} | {2, 6}, {2, 10} | 2 |
| {2, 9} | {2, 5}, {2, 7} | 2 |
| {2, 10} | {2, 6}, {2, 8} | 2 |
| (3, 11}, or (4, 14) | {1, 1}, {3, 12}, {4, 13}, {4, 14}, {4, 16}, {4, 17} | 1, 3 and 4 |
| (3, 12}, or (4, 16) | {1, 1}, {3, 11}, {4, 13}, {4, 14}, {4, 15}, {4, 16}, {4, 17} | 1, 3 and 4 |
| {4, 15} | {1, 1}, (3, 12), (4, 13), (4, 16), (4, 17) | 1, 3 and 4 |
| {4, 17} | {1, 1}, {1, 3}, (3, 11}, {3, 12}, {4, 13}, {4, 14}, {4, 15}, {4, 16} | 1, 3 and 4 |
| (6, 18) | None | 6 |

In this example, subframe configuration determining component 214 can determine a compatible carrier to a carrier assigned to the backhaul link based on the carrier and the above table. Once subframe configuration determining component 214 determines compatible carrier(s) (e.g., the initial and additional carriers), carrier selecting component 216 can select the carrier(s) for assigning to relay 206 backhaul link communications, as described.

Moreover, in one example, carrier selecting component 216 can select at least one FDD carrier and at least one TDD carrier for aggregating in backhaul communications with relay 206 according to the above considerations (e.g., ensuring the carriers are compatible). In the above examples, it is to be appreciated that the allowed compatible carrier configurations can be hardcoded or otherwise configured for the eNB, and the carrier selecting component 216 selects one or more of the allowed compatible carrier configurations for backhaul link communications with the relay 206. The carrier assignment receiving component 222 obtains the assignment for utilizing the carriers over the backhaul.

The PCC/SCC determining component 212 and/or 224 can determine one of the carriers as a PCC and/or SCC based on one or more factors. In one example, PCC/SCC determining component 212 and/or 224 can select the PCC as the carrier with the most configured subframes for backhaul downlink or uplink (e.g., the carrier with the subframe configuration of which the other subframe configuration(s) for the other carrier(s) are a subset). In one example, where the subframe configuration is represented as a number of bits, as described above, PCC/SCC determining component 212 and/or 224 can select the carrier with the subframe configuration having the most number of active bits as the PCC. For example, as described, the PCC can be utilized for communicating control data for the aggregated carriers, and thus a carrier with more reliable and/or more frequent transmission opportunities can be selected as the PCC.

In addition, at least a portion of subframes in a configuration for a carrier that are not reserved for backhaul communications can be utilized by access link component 218 for access link communications with UE 202. In this regard, access link component 218 can configure one or more carriers assigned by carrier aggregating component 210 for additional communications over the access link in certain subframes. In this example, because the PCC/SCC determining component 212 and/or 224 determines the PCC as the carrier with the subframe configuration having the most subframes configured for backhaul or downlink communication, PCC/SCC determining component 212 and/or 224 can determine the PCC for the backhaul link as an SCC for the access link and/or an SCC for the backhaul link as the PCC for the access link based on the complementary configuration of subframes (e.g., subframes not configured for backhaul or downlink communications can be configured for access link communications). For example, the SCC of the backhaul link can have a less number of subframes configured for backhaul link or downlink communication as compared to the PCC; thus, on the access link, the SCC of the backhaul link has a higher number of subframes available for access link communications, and can thus be configured as the access link PCC.

In another example, carrier selecting component 216 can aggregate carriers without such restrictions on subframe configuration compatibility. In this example, PCC/SCC determining component 212 and/or 224 can determine a primary carrier, or a primary uplink and/or downlink subframe (e.g., a primary carrier for each uplink and/or downlink subframe). As an example, an initial carrier may have a configuration of {2, 7}, where the first index corresponds to eNB to relay TDD uplink-downlink subframe configuration, and the second index corresponds to SubframeConfigurationTDD, as shown in the example table above. This results in a subframe configuration of:

| Subframe# | 0 | 1 | 2 | 3 | 4 | 5 | 6 | 7 | 8 | 9 |
|---|---|---|---|---|---|---|---|---|---|---|
| Config | | U | | D | | | | | D | | for backhaul, where blank subframes are not available for backhaul. An additional carrier may use a configuration of {1, 0}, resulting in a subframe pattern of:

| Subframe# | 0 | 1 | 2 | 3 | 4 | 5 | 6 | 7 | 8 | 9 |
|---|---|---|---|---|---|---|---|---|---|---|
| Config | | | | D | | | | U | | | for backhaul. These two carriers are not compatible for backhaul at least since the corresponding subframe patterns for backhaul are not a subset of each other. Such a combination, however, may still be allowed for aggregated carriers in TDD. For example, PCC/SCC determining component 212 and/or 224 can designate the initial carrier as the PCC, and the additional carrier as the SCC. In this regard, subframe 8, which is a downlink subframe for the initial carrier and an uplink subframe for the additional carrier, can be treated as a downlink subframe for the backhaul link. In this example, the initial carrier is available for downlink transmission (e.g., and not the additional carriers). Alternatively, in another example, PCC/SCC determining component 212 and/or 224 can designate the initial carrier as the PCC in subframe 2, and the additional carrier as PCC in subframe 4 and subframe 8.

In any case, backhaul link components 208 and 220 can communicate control data for the multiple carriers over the PCC. For example, backhaul component 220 can transmit ACK/NAK feedback over the PCC for the plurality of carriers. Backhaul link component 208 can receive the ACK/NAK feedback over the PCC for the plurality of backhaul link carriers, and can accordingly process the ACK/NAK feedback. In this regard, backhaul link component 220 can utilize an ACK/NAK transmission timeline corresponding to the PCC to communicate ACK/NAK feedback for other carriers.

For example, backhaul link component 220 can determine ACK/NAK transmission opportunities on the PCC for additionally transmitting feedback related to other carriers, which can include selecting a feedback opportunity that is at least a certain time delay from transmissions received over the other carriers. As an example, the initial carrier may use a configuration of {1, 4}, as described above, where the first index corresponds to eNodeB to RN TDD uplink-downlink subframe configuration and the second index corresponds to SubframeConfigurationTDD. This configuration results in a subframe pattern of:

| Subframe# | 0 | 1 | 2 | 3 | 4 | 5 | 6 | 7 | 8 | 9 |
|---|---|---|---|---|---|---|---|---|---|---|
| Config |  |  |  | U | D |  |  |  | U | D | for backhaul. An additional carrier may use a configuration of {1, 3}, resulting in a subframe pattern of:

| Subframe# | 0 | 1 | 2 | 3 | 4 | 5 | 6 | 7 | 8 | 9 |
|---|---|---|---|---|---|---|---|---|---|---|
| Config |  |  |  | U | D |  |  |  |  | D | for backhaul. In an example, PCC/SCC determining component 212 and/or 224 can designate the initial carrier as the PCC and the additional carrier as an SCC. In this case, the ACK/NAK timing for downlink transmissions for the SCC can follow the ACK/NAK timing for downlink transmissions specified for the PCC at least because downlink subframes of the SCC are a subset of those of the PCC, resulting in improved ACK/NAK feedback latency. Alternatively, the ACK/NAK timing for downlink transmissions for the SCC can follow the ACK/NAK timing for downlink transmissions specified for the SCC. Similarly, the UL HARQ timing, including the timing from a control channel to an uplink transmission, and the timing from an uplink transmission to a next control channel for a SCC may follow the timing specified for a PCC depending on the configurations of subframes of the carriers in aggregation for the backhaul link. In addition, backhaul link component 220 can aggregate feedback for the multiple carriers for transmission at a feedback opportunity on the PCC.

Similarly, backhaul link component 220 can determine an ACK/NAK feedback receiving timeline for receiving feedback from eNB over the backhaul link carriers. For example, backhaul link component 220 can similarly receive ACK/NAK feedback for other carriers over the PCC. Thus, backhaul link component 220 can also similarly determine an ACK/NAK receiving timeline for the other carriers based on the ACK/NAK feedback receiving timeline specified and utilized for the PCC.

Moreover, for example, backhaul link component 208 can communicate downlink or uplink grants for the backhaul carriers to relay 206 over the PCC. In this example, backhaul link component 220 can receive the downlink or uplink grants, and accordingly utilize the grants to receive or transmit backhaul data over the associated carriers. In an example, backhaul link component 208 can transmit an uplink grant for the other carriers over the PCC using an uplink grant transmission timeline associated with the PCC, and thus, the backhaul link component 220 receives the uplink grant according to the timeline. For example, backhaul link component 208 can indicate a carrier corresponding to a grant received over the PCC using an identifier of the carrier (e.g., which can be received with the carrier assignment at carrier assignment receiving component 222). Thus, backhaul link component 220 can associate grants with the given carriers based on the identifier.

In this regard, backhaul link components 208 and 220 support cross-subframe signaling and/or revised HARQ timing over the carriers. In yet another example, backhaul link components 208 and 220 can enforce certain scheduling restrictions to allow aggregating the carriers, such as not scheduling downlink subframes for some carriers, not scheduling uplink subframes for some carriers, not allowing ACK/NAK feedback for some subframes of some carriers, etc. where the subframes would conflict.

Moreover, for example, carrier selecting component 216 can select or otherwise configure at least one carrier for backhaul communications at relay 206 and at least one carrier for access link communications at the relay 206 (e.g., and/or relay 206 can configure such carriers). The carriers can be FDM and allow for full duplex communications. In this example, the carriers can thus be assigned to additional relays (not shown), and can be assigned for different communications. For example, the at least one carrier configured for uplink communications with relay 206 can be configured for backhaul link communications with another relay. This can facilitate load balancing among relays, in one example. In another example, at least one of the carriers can be time division multiplexing (TDM) for half duplex communications as currently supported by relays in LTE, allowing backhaul link communications with relay 206 in some subframes and access link communications from relay 206 to UE 202 in other subframes.

In these examples, PCC/SCC determining component 212 and/or 224 can determine which of the carriers is to be the PCC based at least in part on whether the carriers are configured for FDM or TDM communications. In one example, PCC/SCC determining component 212 and/or 224 can select a carrier configured for FDM communications as the PCC since the FDM carrier can have more transmission opportunities and/or flexibility over a TDM carrier. In this regard, the FDM carrier can be used for communicating relay physical downlink control channel (R-PDCCH), physical uplink control channel (PUCCH), and/or other control channels over the backhaul link.

Further, a carrier can be configured for backhaul link communications only. In this regard, carrier selecting component 216 can select another carrier, for aggregating with the backhaul only carrier, that has at least one access link subframe. In yet another example, carrier selecting component 216 can select a third carrier that is configured for access link communications only.

In the above examples, once carrier selecting component 216 has selected the carriers for the backhaul link and/or carrier aggregating component 210 has aggregated and assigned the carriers to relay 206, carrier assignment receiving component 222 can receive the carrier assignment from eNB 204, and backhaul link component 220 can utilize the aggregated carriers for communicating over the backhaul link with eNB 204 (e.g., according to a subframe configuration). Similarly, where PCC/SCC determining component 212 determines the PCC and/or SCC of the plurality of carriers for backhaul and/or access link communications, PCC/SCC determining component 212 can indicate such in the carrier assignment, and carrier assignment receiving component 222 can determine the PCC and/or SCC as specified in the carrier assignment. In this example, backhaul link component 220 and/or access link component 218 can use the PCC for communicating HARQ feedback, receiving access grants, etc., for all assigned carriers.

Moreover, though shown as determined by eNB 204, it is to be appreciated that the relay 206 can determine the carriers according to a hardcoding or configuration (e.g., using a similar carrier aggregating component 210) and/or can negotiate the carriers with eNB 204, etc., as described above, using one or more similar components shown in the eNB 204.

In addition, backhaul link components 208 and 220 can allow different downlink and uplink timings among different carriers. For example, for carriers of different system types (e.g., FDD or TDD), this can provide deployment flexibility. The difference in timing can generally be less than half a symbol duration (about 30 microseconds) in typical deployments, which may not result in additional standardization changes.

Figure 3:
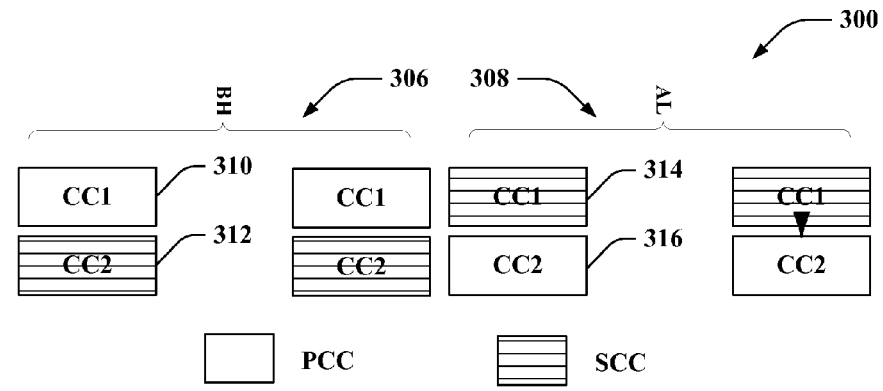
FIG. 3 illustrates example aggregated carrier configurations for relay backhaul communications.
Figure 3:
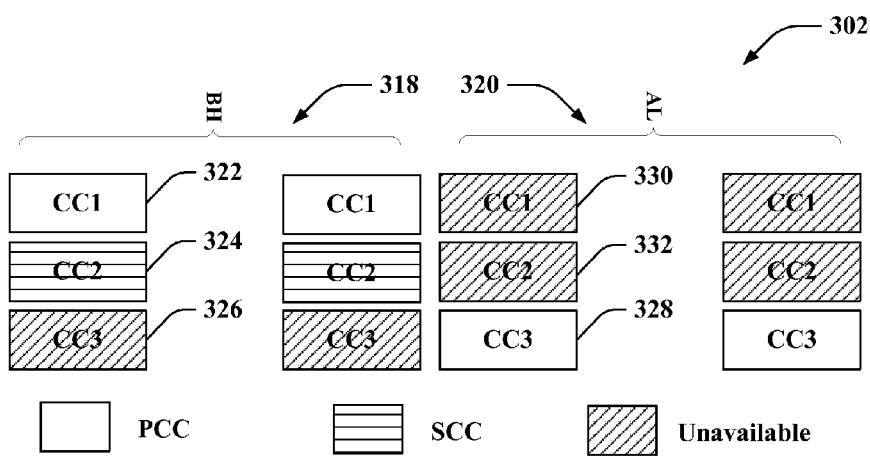
Figure 3:
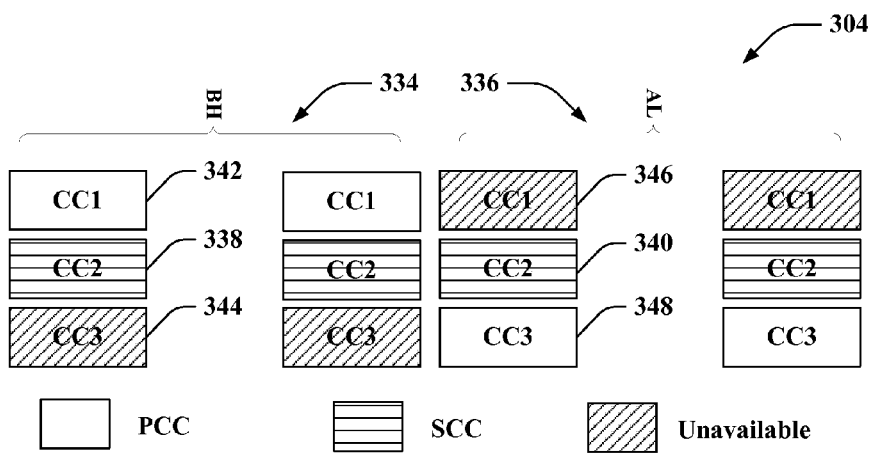

FIG. 3 illustrates example carrier configurations 300, 302, and 304 for a backhaul and access link according to aspects described herein. Carrier configuration 300 shows a complementary carrier configuration between a backhaul link (BH) 306 and an access link 308 at a relay, as described above. In this example, the backhaul link 306 uses CC1 310 for the PCC for uplink and downlink, and CC2 312 for a SCC. As described, for example, CC2 312 can thus have a subframe configuration that is compatible with (e.g., a subset of) the subframe configuration for CC1 310. Thus, for the access link (AL), the subframe configuration for CC1 314 (e.g., subframes not configured for the backhaul link CC1 310) can be a subset of the subframe configuration for CC2 316. Thus, CC2 316 can be configured as the PCC of the access link.

Carrier configuration 302 shows an example aggregated carrier configuration for a backhaul link 318 and access link 320 at a relay. In this example, backhaul link 318 and access link 320 can include FDM carriers that facilitate full duplex communications. For example, CC1 322 and CC2 324 can be configured for the backhaul link as PCC and SCC, respectively. In this example, CC3 326 is not configured for the backhaul link, but CC3 328 can be configured for the access link, where CC1 330 and CC2 332 are not configured for the access link. Thus, in this carrier configuration, the carriers are FDM and are each assigned for either backhaul link or access link communication (but not both) to mitigate potential interference.

Carrier configuration 304 shows an example aggregated carrier configuration for a backhaul link 334 and an access link 336 at a relay. In this example, backhaul link 334 and access link 336 can both utilize at least one carrier in TDM, such as CC2 338 at backhaul link 334 and CC2 340 at access link 336. In this example, in certain subframes, CC2 338 can be used for backhaul link communications, and in other subframes, CC2 340 can be used for access link communications using TDM. CC1 342 can be determined as the PCC for the backhaul link 334 by virtue of being an FDM carrier, and CC3 348 can similarly be determined as the PCC for access link 336. In the depicted example, CC3 344 is not utilized on the backhaul link 334, and CC1 346 is not utilized over access link 336. An eNB can select carriers according to the configurations 300, 302, and/or 304 (e.g., an initial carrier and additional carriers, as described).

Figure 4:
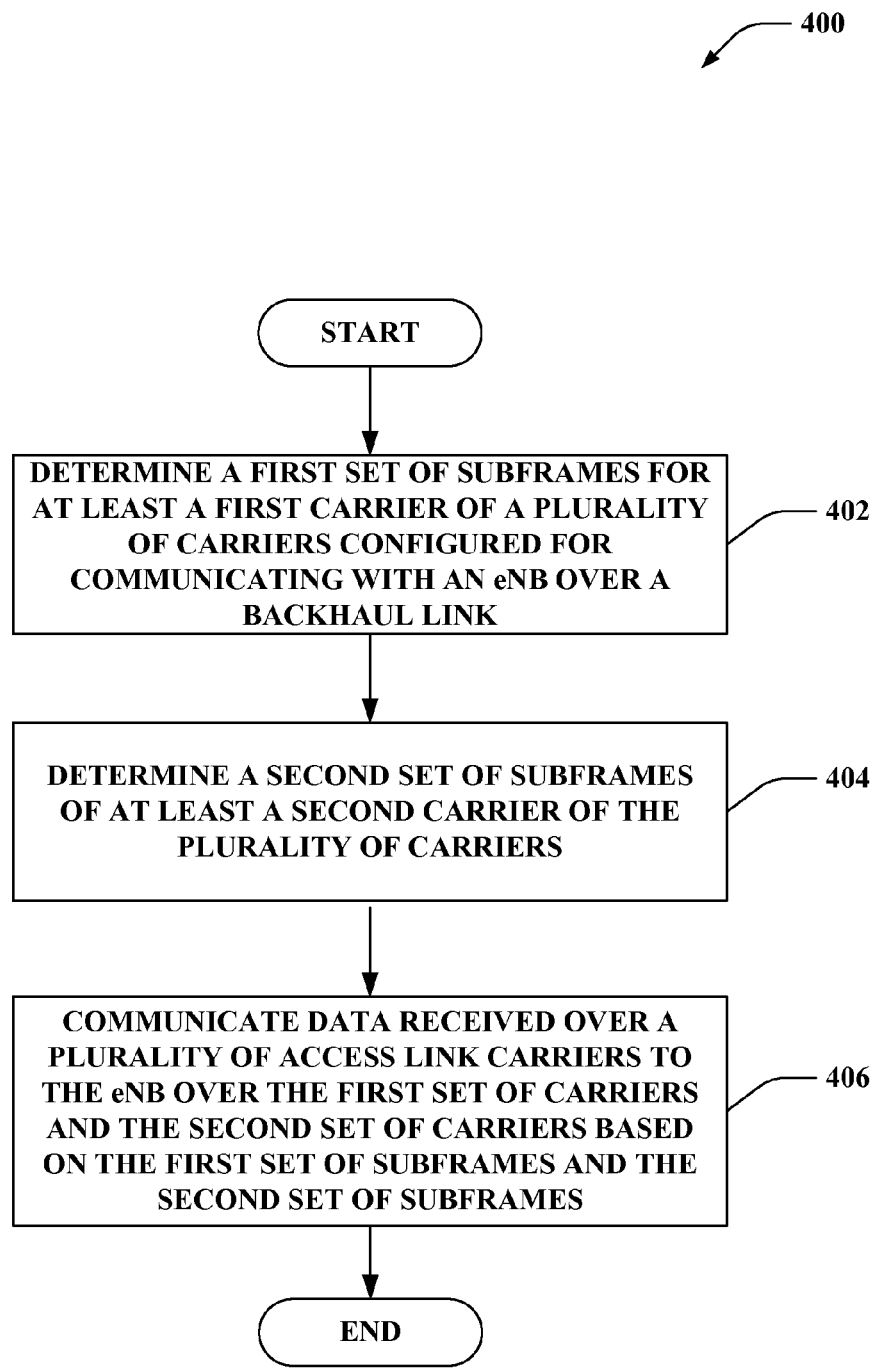
FIG. 4 illustrates an example methodology for determining backhaul subframes over which to communicate in a wireless network.
Figure 5:
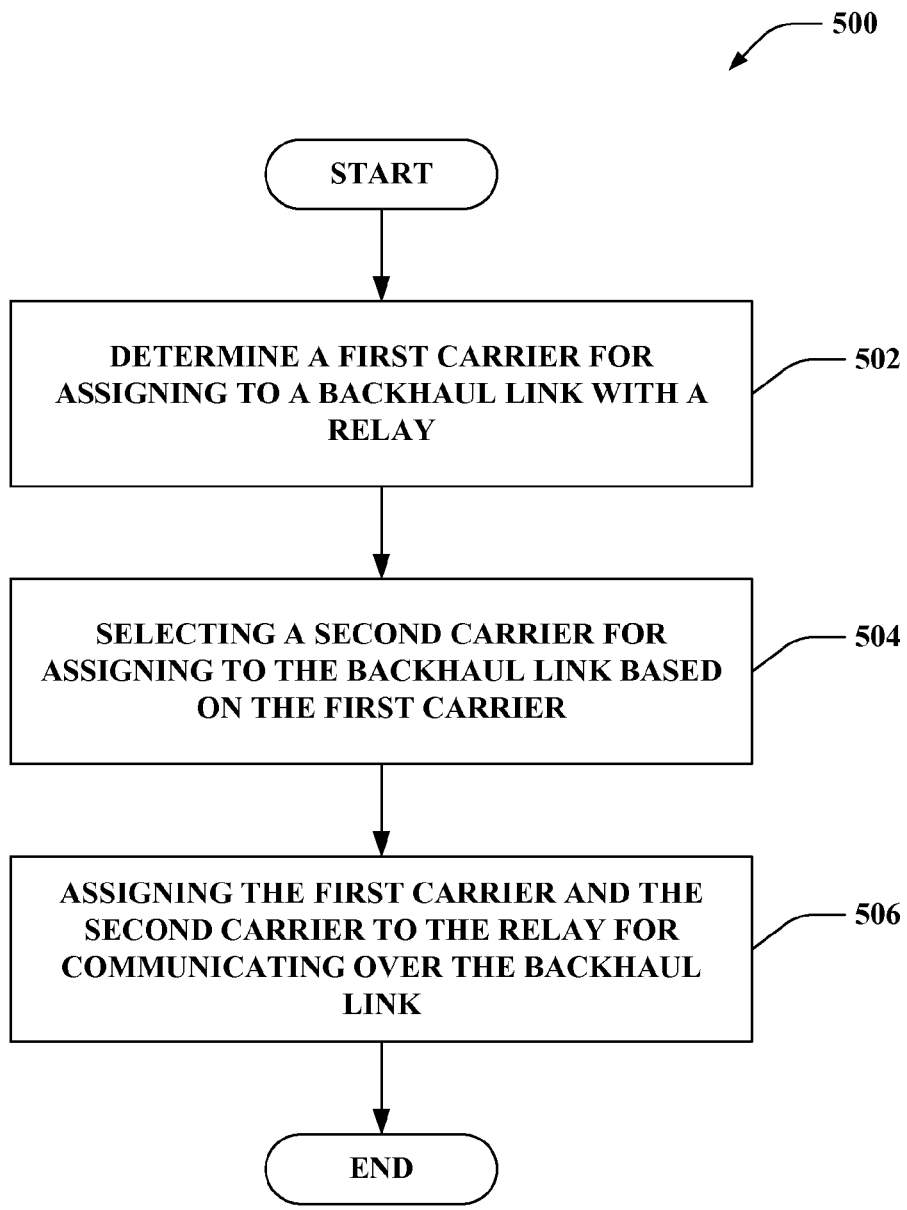
FIG. 5 illustrates an example methodology for selecting carriers for aggregation over a backhaul link with a relay.

FIGS. 4-5 illustrate example methodologies for aggregating carriers for relay backhaul communications. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 4 illustrates an example methodology 400 for communicating over multiple aggregated carriers of a backhaul link between a relay and an eNB.

At 402, a first set of subframes for at least a first carrier of a plurality of carriers configured for communicating with an eNB over a backhaul link can be determined. In an example, an assignment of the plurality of carriers can be received in a carrier assignment from the eNB. The carrier assignment can indicate the subframes configured for communicating over the backhaul link using each carrier, in one example. The indication can be an explicit identification of specific subframes, a configuration identifier from which the subframes can be derived, and/or the like.

At 404, a second set of subframes of at least a second carrier of the plurality of carrier can be determined. Similarly, the subframes can be determined from an indication in a carrier assignment received from the eNB. In one example, the first set of subframes and the second set of subframes can be different. For example, corresponding access link carriers with a UE can be different as well.

At 406, data received over a plurality of access link carriers can be communicated to the eNB over the first set of carriers and the second set of carriers based on the first set of subframes and the second set of subframes. In one example, the second set of subframes can be a subset of the first set of subframe (or vice versa) to allow half duplex operation during the subframes. For example, the first set of subframes can relate to downlink subframes for receiving communications from the eNB, and the second set of subframes can include at least a subset of the downlink subframes. Additionally, in this regard, one of the carriers can be selected or otherwise specified as a PCC for communicating control data (e.g., ACK/NAK feedback, scheduling grants, etc.) for the first and second carriers. Generally, the carrier with the larger number of configured backhaul link subframes can be the PCC. In addition, it is to be appreciated that the first and/or second carrier can be FDM, and the relay can communicate in full duplex. Additional carriers can be similarly configured.

FIG. 5 illustrates an example methodology 500 for assigning aggregated carriers to a backhaul link for a relay.

At 502, a first carrier can be determined for assigning to a backhaul link with a relay. For example, the carrier can be selected to have a certain subframe configuration for communicating over the backhaul link.

At 504, a second carrier can be selected for assigning to the backhaul link based on the first carrier. In one example, the second carrier can be selected to have a subframe configuration that is a subset of the first carrier. As described, this can include selecting the second carrier to have downlink subframes configured in a subset of subframes as a subframe configuration of the first carrier. Moreover, the carriers can be selected at a similar time as part of a configuration, and/or one or more of the carriers can be selected based on an initially established carrier, etc. In another example, the first carrier can be FDM, and the second carrier can be FDM or TDM, etc.

At 506, the first carrier and the second carrier can be assigned to the relay for communicating over the backhaul link. This can include communicating a carrier assignment to the relay (e.g., over the backhaul link). The carrier assignment can indicate the subframe configurations (e.g., by an explicit indication, such as a bitmap of which subframes are configured for downlink, by a configuration identifier, and/or the like). Moreover, the carrier assignment can indicate which carrier is to be the PCC, in one example.

Figure 6:
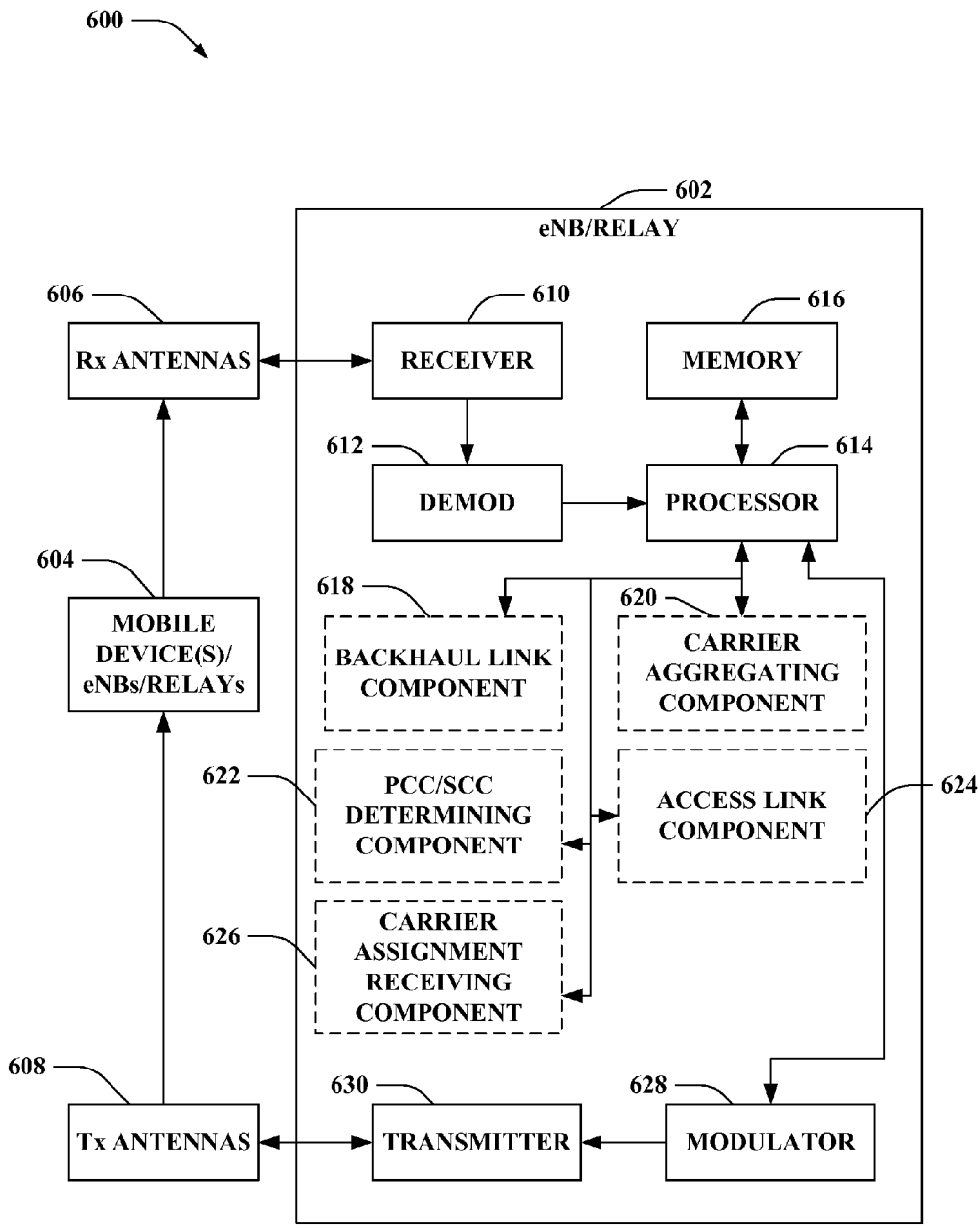
FIG. 6 illustrates an example system in accordance with aspects described herein.

FIG. 6 is an illustration of a system 600 that facilitates communicating over a backhaul link using multiple aggregated carriers. System 600 includes a eNB or relay 602 having a receiver 610 that receives signal(s) from one or more mobile devices, eNBs, or relays 604 through a plurality of receive antennas 606 (e.g., which can be of multiple network technologies), and a transmitter 630 that transmits to the one or more mobile devices/eNBs/relays 604 through a plurality of transmit antennas 608 (e.g., which can be of multiple network technologies). For example, eNB 602 can be a relay node that transmits signals received from mobile devices 604 to eNBs 604, and/or vice versa. Receiver 610 can receive information from one or more receive antennas 606 and is operatively associated with a demodulator 612 that demodulates received information. In addition, in an example, receiver 610 can receive from a wired or wireless backhaul link. Though depicted as separate antennas, it is to be appreciated that at least one of receive antennas 606 and a corresponding one of transmit antennas 608 can be combined as the same antenna. Demodulated symbols are analyzed by a processor 614, which is coupled to a memory 616 that stores information related to performing one or more aspects described herein.

Processor 614, for example, can be a processor dedicated to analyzing information received by receiver 610 and/or generating information for transmission by a transmitter 630, a processor that controls one or more components of eNB 602, and/or a processor that analyzes information received by receiver 610, generates information for transmission by transmitter 630, and controls one or more components of eNB 602. In addition, processor 614 can perform one or more functions described herein and/or can communicate with components for such a purpose.

Memory 616, as described, is operatively coupled to processor 614 and can store data to be transmitted, received data, information related to available channels, data associated with analyzed signal and/or interference strength, information related to an assigned channel, power, rate, or the like, and any other suitable information for estimating a channel and communicating via the channel. Memory 616 can additionally store protocols and/or algorithms associated with establishing aggregated carriers for backhaul communications, and/or the like.

It will be appreciated that the data store (e.g., memory 616) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 616 of the subject systems and methods is intended to comprise, without being limited to, these and any other suitable types of memory.

Processor 614 is further optionally coupled to a backhaul link component 618, which can be similar to backhaul link components 208 and/or 220, a carrier aggregating component 620, which can be similar to carrier aggregating component 210, a PCC/SCC determining component 622, which can be similar to PCC/SCC determining components 212 and/or 224, an access link component 624, which can be similar to access link component 218, and/or a carrier assignment receiving component 626, which can be similar to carrier assignment receiving component 222. Moreover, for example, processor 614 can modulate signals to be transmitted using modulator 628, and transmit modulated signals using transmitter 630. Transmitter 630 can transmit signals to mobile devices or eNBs 604 over Tx antennas 608. Furthermore, although depicted as being separate from the processor 614, it is to be appreciated that the backhaul link component 618, carrier aggregating component 620, PCC/SCC determining component 622, access link component 624, carrier assignment receiving component 626, demodulator 612, and/or modulator 628 can be part of the processor 614 or multiple processors (not shown), and/or stored as instructions in memory 616 for execution by processor 614.

Figure 7:
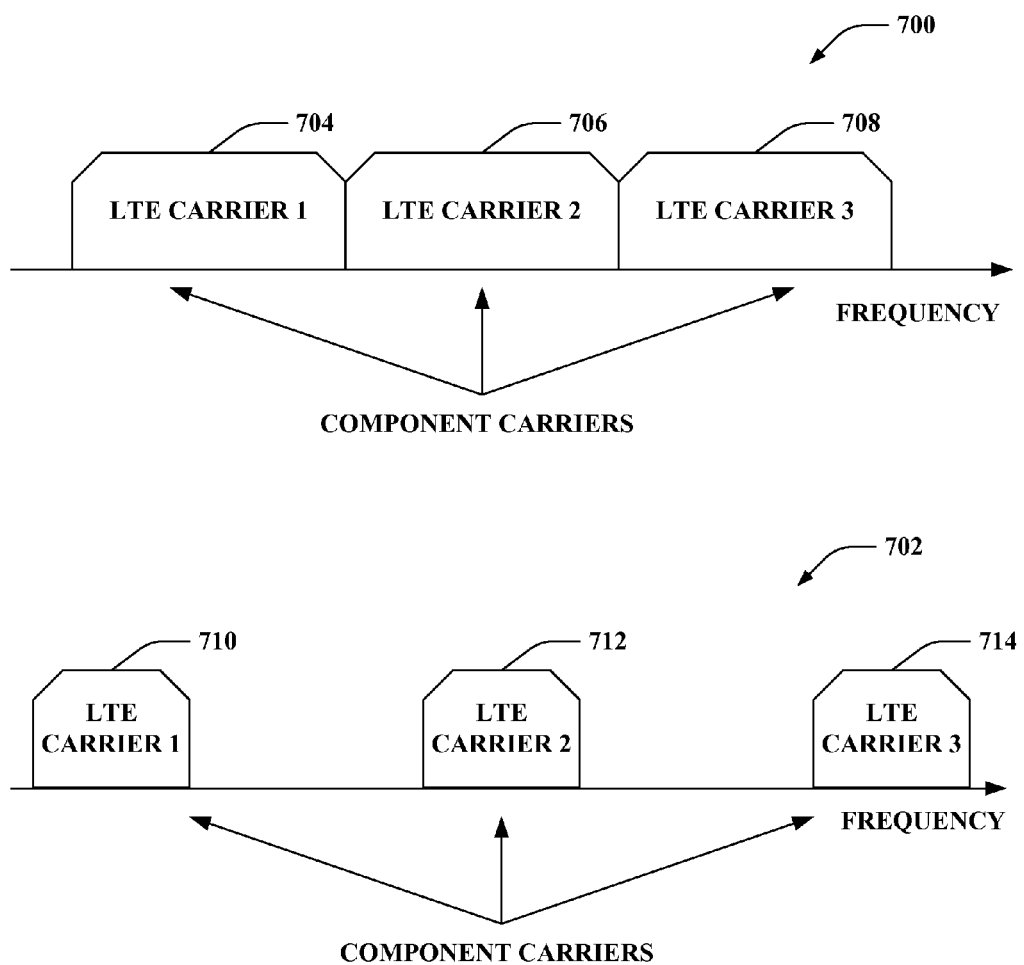
FIG. 7 illustrates example carrier aggregation configurations.

Various aspects herein are described in terms of multicarrier configurations. Some examples of a multicarrier configuration are proposed for the LTE-Advanced mobile systems including continuous carrier aggregation (CA) and non-continuous CA, examples of which are illustrated in FIG. 7. Continuous CA is shown at 700 and occurs when multiple available component carriers 704, 706, and 708 are assigned as adjacent to each other in frequency. In non-continuous CA, shown at 702, the component carriers 710, 712, and 714 can be assigned such that they are not adjacent in frequency. Both non-continuous and continuous CA aggregate multiple LTE/component carriers to serve a single unit of LTE-Advanced UE, for example.

An LTE-Advanced UE can employ multiple radio frequency (RF) receiving units and multiple fast Fourier transforms with non-continuous CA since the carriers are separated along the frequency band. Where continuous CA is used, one RF receiving component and FFT may be sufficient to receive over all carriers. Because non-continuous CA supports data transmissions over multiple separated carriers across a large frequency range, propagation path loss, Doppler shift and other radio channel characteristics may vary at different frequency bands.

Thus, to support broadband data transmission under the non-continuous CA approach, methods may be used to adaptively adjust coding, modulation, and transmission power for different component carriers. For example, in an LTE-Advanced system where the eNB has fixed transmitting power on each component carrier, the effective coverage or supportable modulation and coding of each component carrier may be different. In any case, the carriers 704, 706, and 708, or 710, 712, and 714 can be assigned by multiple eNBs or related cells, and the LTE-Advanced UE can report cell identifiers for each to a positioning server, as described.

Figure 8:
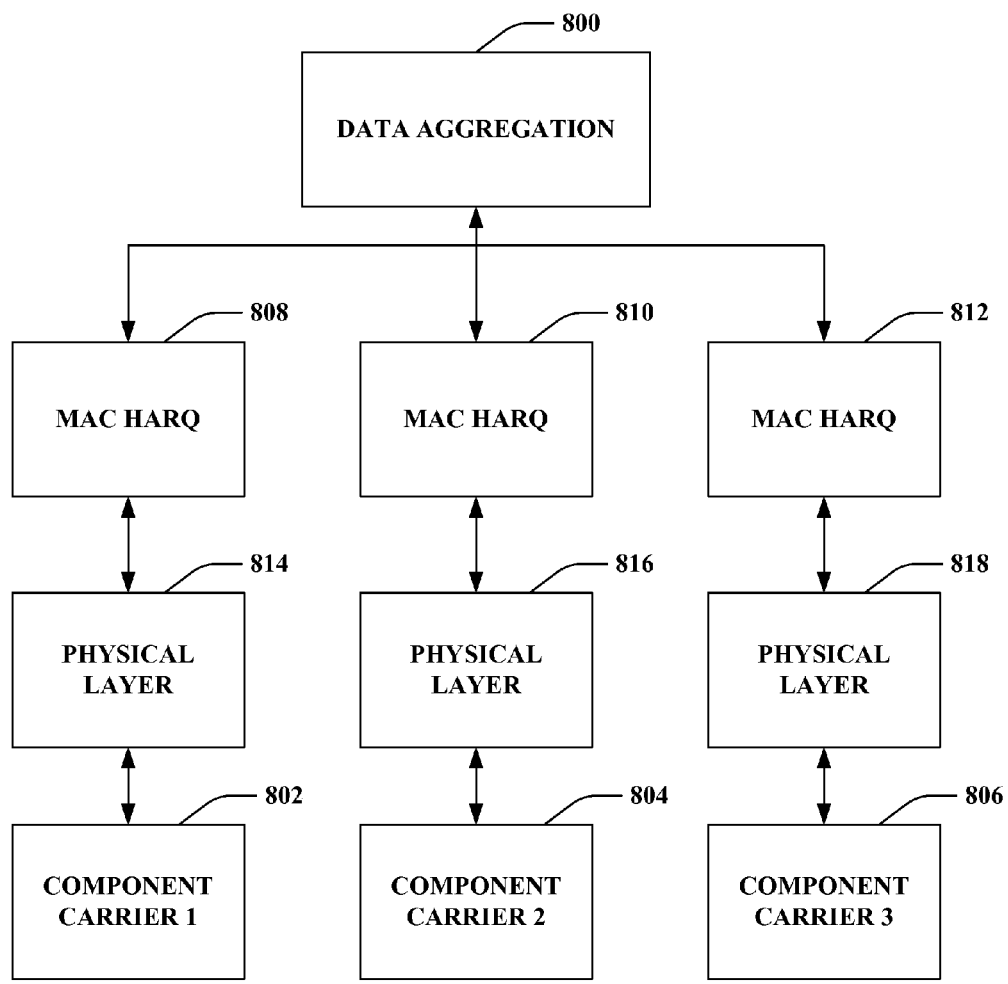
FIG. 8 illustrates example MAC layer carrier aggregation.

FIG. 8 illustrates example data aggregation 800 to aggregate transmission blocks (TBs) from different component carriers 802, 804, and 806 at the medium access control (MAC) layer for an International Mobile Telecommunications (IMT)-Advanced or similar system. With MAC layer data aggregation, each component carrier 802, 804, and 806, has its own independent hybrid automatic repeat request (HARQ) entity 808, 810, and 812 in the MAC layer and its own transmission configuration parameters (e.g., transmitting power, modulation and coding schemes, and multiple antenna configuration) in the physical layer. Similarly, in the physical layer, one HARQ entity can be provided for each component carrier, e.g., via Physical Layer entities 814, 816, and 818.

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers can be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. This method, however, may not be compatible with some LTE systems.

Moreover, for example, in CA, control functions from at least two carriers can be aggregated onto one carrier to form a PCC and one or more associated SCCs. Communication links can be established for the PCC and each SCC with one or more cells or related eNBs. Then, communication can be controlled based on the PCC, in one example of a multicarrier configuration.

Figure 9:
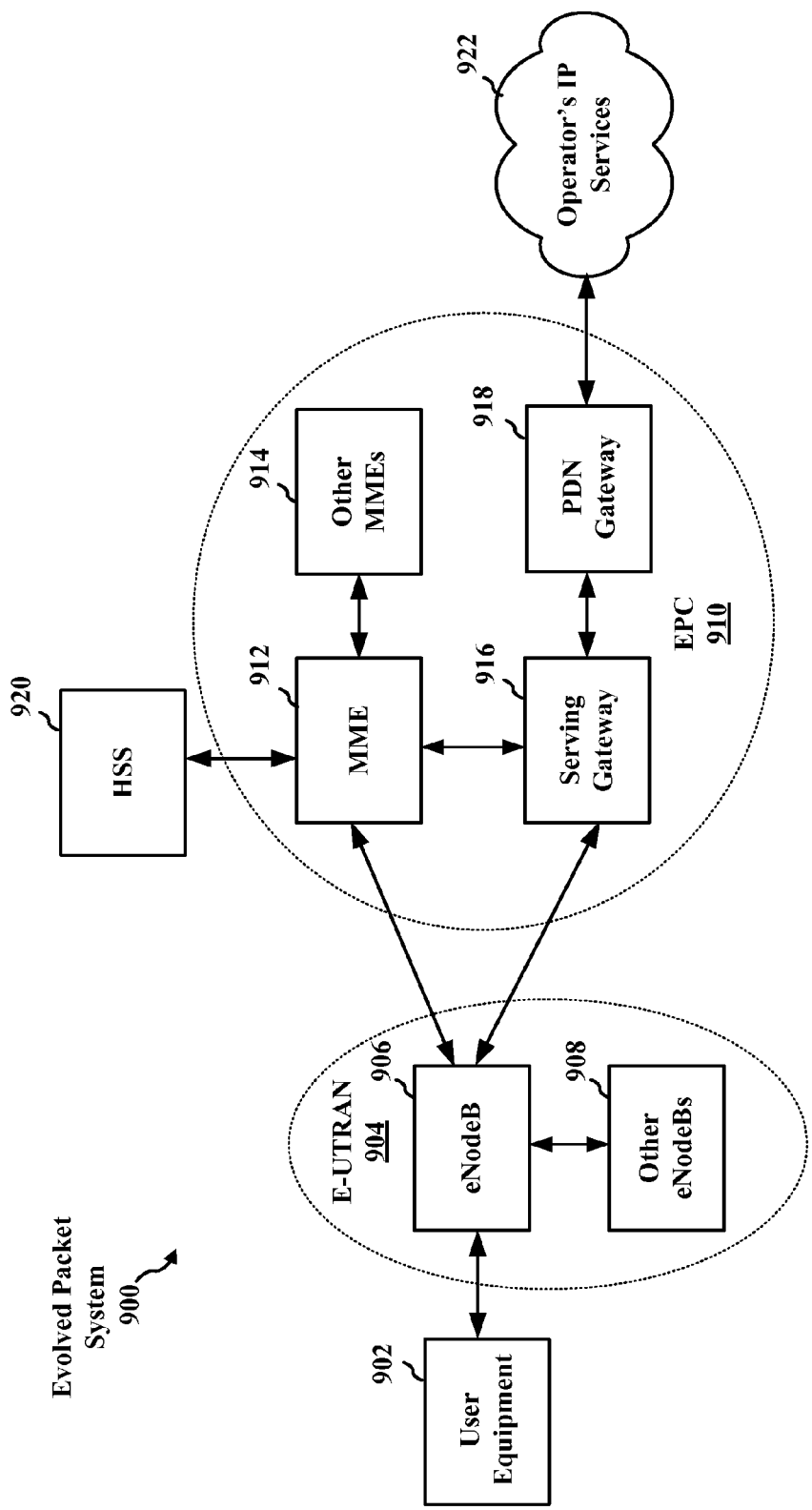
FIG. 9 is a diagram illustrating an example of a network architecture.

FIG. 9 is a diagram illustrating an LTE network architecture 900. The LTE network architecture 900 may be referred to as an Evolved Packet System (EPS) 900. The EPS 900 may include one or more user equipment (UE) 902, an Evolved UMTS Terrestrial Radio Access Network (E-UTRAN) 904, an Evolved Packet Core (EPC) 910, a Home Subscriber Server (HSS) 920, and an Operator's IP Services 922. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 906 and other eNBs 908. The eNB 906 provides user and control planes protocol terminations toward the UE 902. The eNB 906 may be connected to the other eNBs 908 via an X2 interface (e.g., backhaul). The eNB 906 may also be referred to as a base station, a base transceiver station, a radio base station, a radio transceiver, a transceiver function, a basic service set (BSS), an extended service set (ESS), or some other suitable terminology. The eNB 906 provides an access point to the EPC 910 for a UE 902. Examples of UEs 902 include a smart phone, a cellular phone, a session initiation protocol (SIP) phone, a tablet, a laptop, a netbook, an ultrabook, a smartbook, a personal digital assistant (PDA), a satellite radio, a global positioning system, a multimedia device, a video device, a digital audio player (e.g., MP3 player), a camera, a game console, or any other similar functioning device. The UE 902 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 906 is connected by an S1 interface to the EPC 910. The EPC 910 includes a Mobility Management Entity (MME) 912, other MMEs 914, a Serving Gateway 916, and a Packet Data Network (PDN) Gateway 918. The MME 912 is the control node that processes the signaling between the UE 902 and the EPC 910. Generally, the MME 912 provides bearer and connection management. All user IP packets are transferred through the Serving Gateway 916, which itself is connected to the PDN Gateway 918. The PDN Gateway 918 provides UE IP address allocation as well as other functions. The PDN Gateway 918 is connected to the Operator's IP Services 922. The Operator's IP Services 922 may include the Internet, an intranet, an IP (Internet Protocol) Multimedia Subsystem (IMS), and a Packet-switched Streaming Service (PSS).

Figure 10:
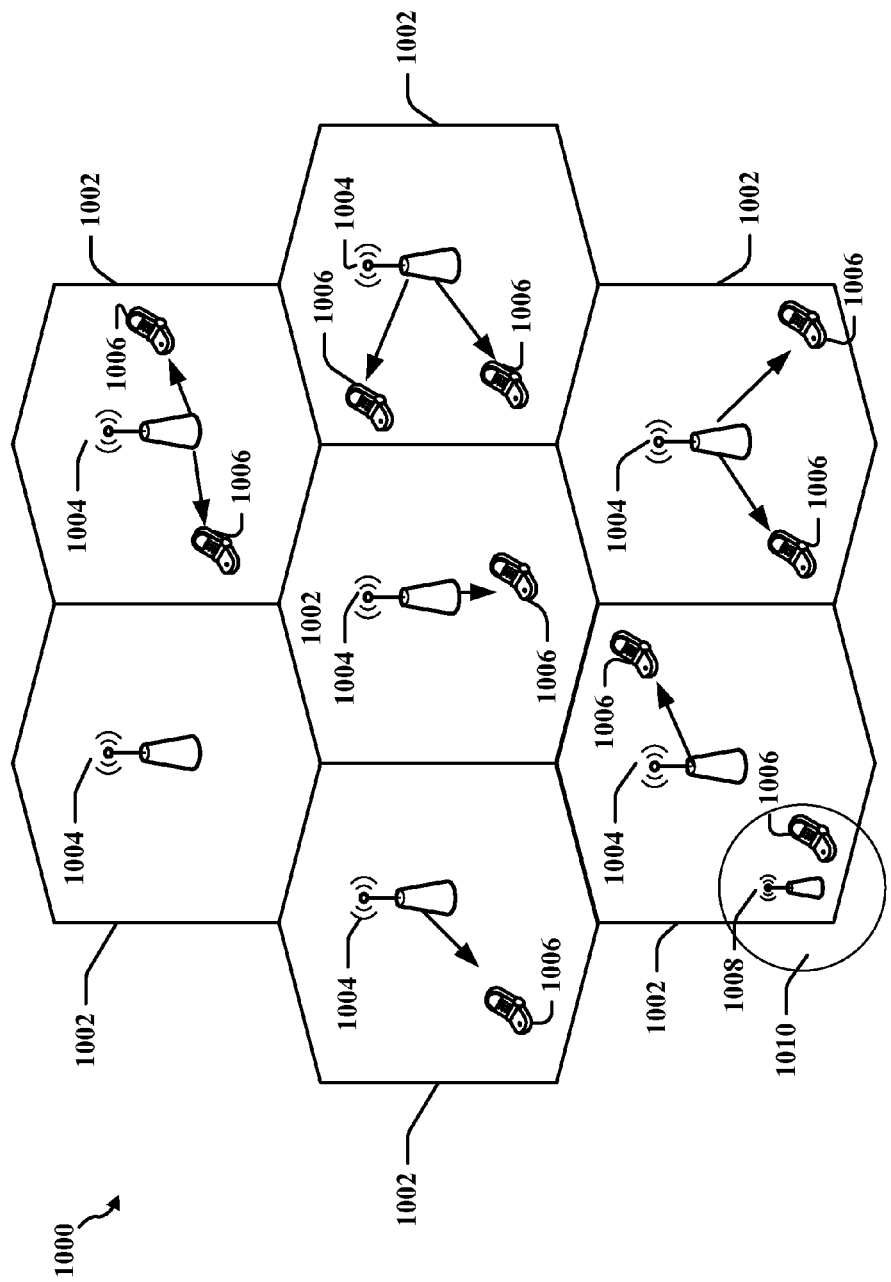
FIG. 10 is a diagram illustrating an example of an access network.

FIG. 10 is a diagram illustrating an example of an access network 1000 in an LTE network architecture. In this example, the access network 1000 is divided into a number of cellular regions (cells) 1002. One or more lower power class eNBs 1008 may have cellular regions 1010 that overlap with one or more of the cells 1002. A lower power class eNB 1008 may be referred to as a remote radio head (RRH). The lower power class eNB 1008 may be a femto cell (e.g., home eNB (HeNB), pico cell, or micro cell). The macro eNBs 1004 are each assigned to a respective cell 1002 and are configured to provide an access point to the EPC 910 for all the UEs 1006 in the cells 1002. There is no centralized controller in this example of an access network 1000, but a centralized controller may be used in alternative configurations. The eNBs 1004 are responsible for all radio related functions including radio bearer control, admission control, mobility control, scheduling, security, and connectivity to the serving gateway 916.

The modulation and multiple access scheme employed by the access network 1000 may vary depending on the particular telecommunications standard being deployed. In LTE applications, OFDM is used on the DL and SC-FDMA (single-carrier frequency division multiple access) is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 1004 may have multiple antennas supporting MIMO technology. The use of MIMO technology enables the eNBs 1004 to exploit the spatial domain to support spatial multiplexing, beamforming, and transmit diversity. Spatial multiplexing may be used to transmit different streams of data simultaneously on the same frequency. The data steams may be transmitted to a single UE 1006 to increase the data rate or to multiple UEs 1006 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 1006 with different spatial signatures, which enables each of the UE(s) 1006 to recover the one or more data streams destined for that UE 1006. On the UL, each UE 1006 transmits a spatially precoded data stream, which enables the eNB 1004 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

For clarity, various aspects of an access network are described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 11:
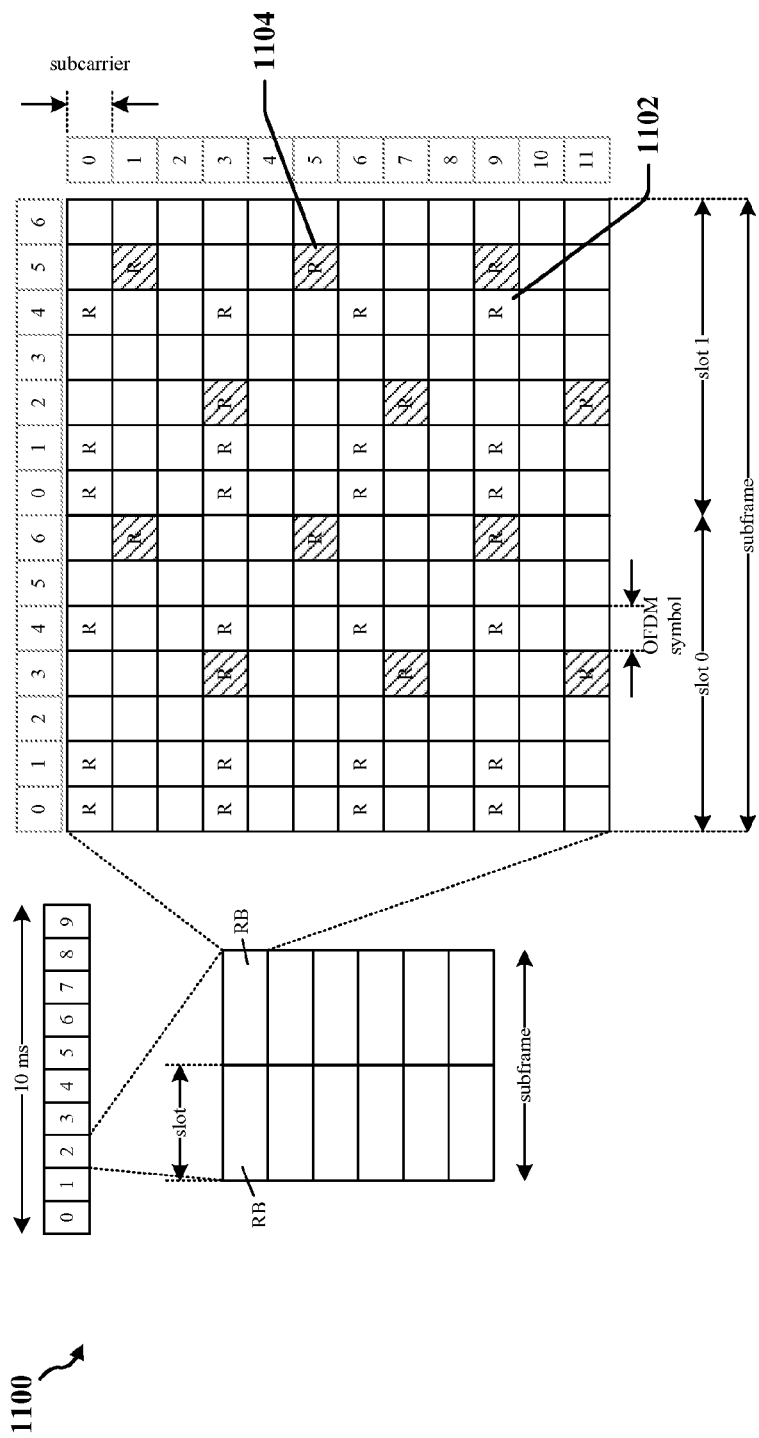
FIG. 11 is a diagram illustrating an example of a downlink (DL) frame structure in long term evolution (LTE).

FIG. 11 is a diagram 1100 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 1102, 1104, include DL reference signals (DL-RS). The DL-RS include Cell-specific RS (CRS) (also sometimes called common RS) 1102 and UE-specific RS (UE-RS) (also known as demodulation reference signals (DM-RS)) 1104. UE-RS 1104 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 12:
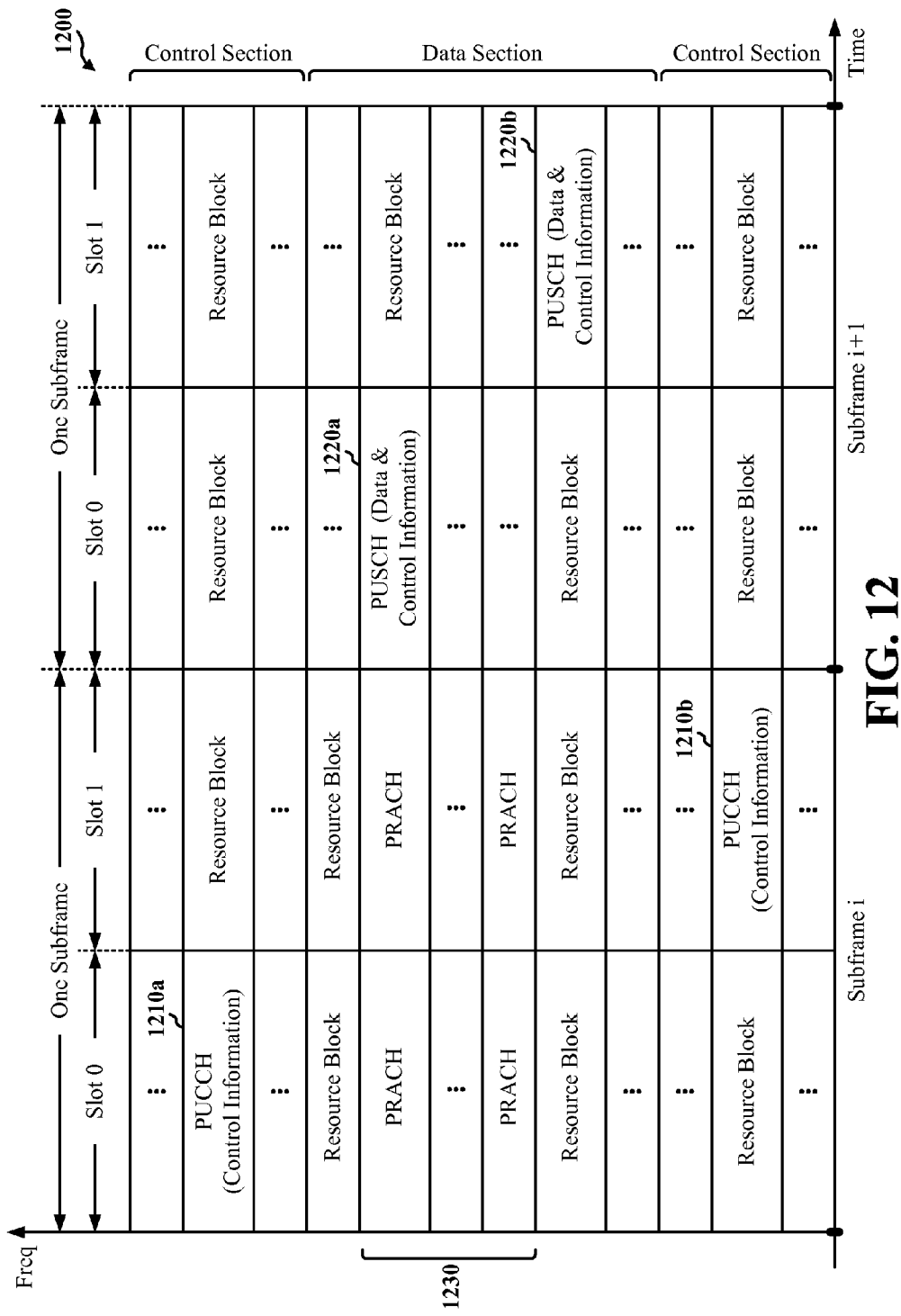
FIG. 12 is a diagram illustrating an example of an uplink (UL) frame structure in LTE.

FIG. 12 is a diagram 1200 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 1210a, 1210b in the control section to transmit control information to an eNB. The UE may also be assigned resource blocks 1220a, 1220b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 1230. The PRACH 1230 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 13:
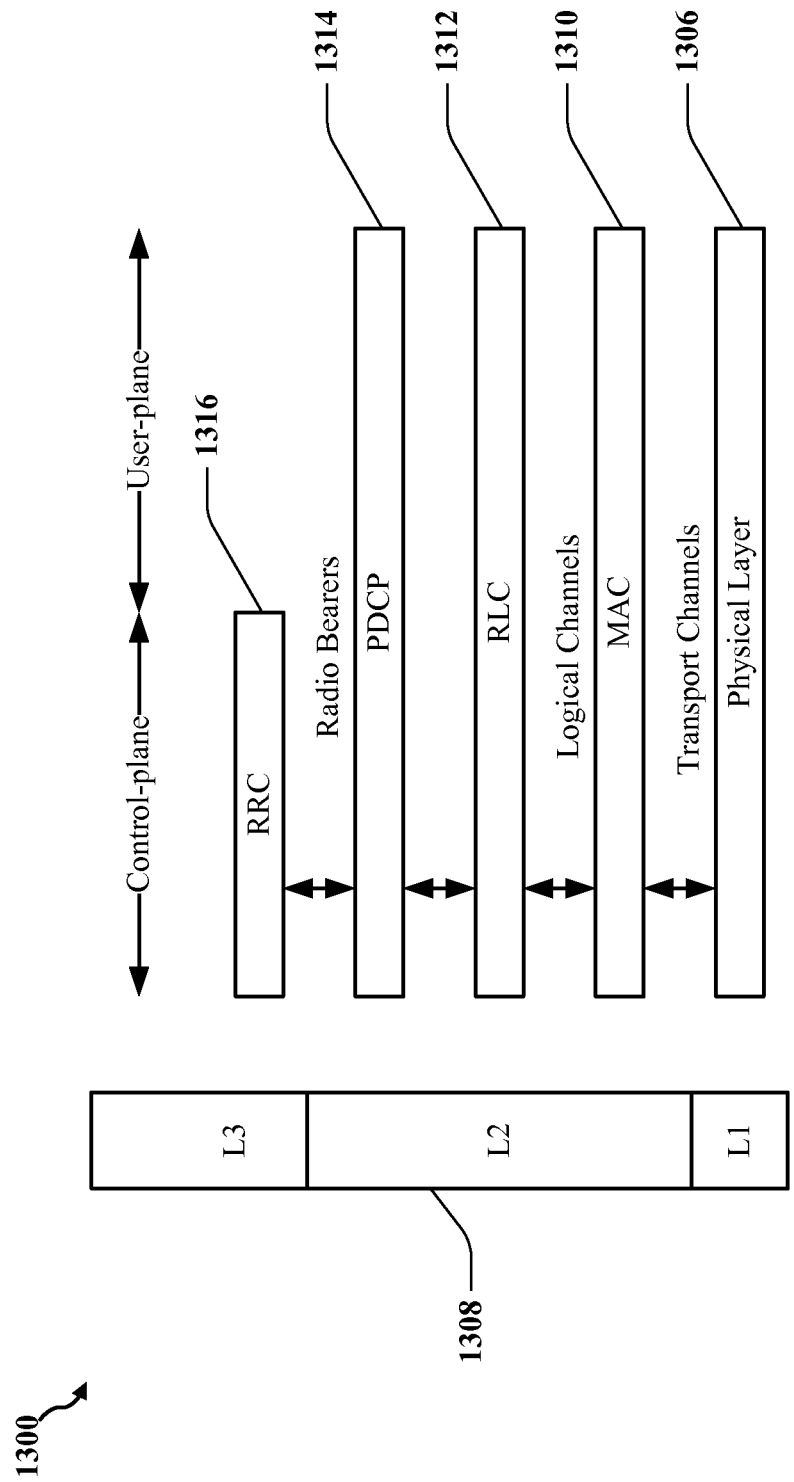
FIG. 13 is a diagram illustrating an example of a radio protocol architecture for the user and control planes.

FIG. 13 is a diagram 1300 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 1306. Layer 2 (L2 layer) 1308 is above the physical layer 1306 and is responsible for the link between the UE and eNB over the physical layer 1306.

In the user plane, the L2 layer 1308 includes a media access control (MAC) sublayer 1310, a radio link control (RLC) sublayer 1312, and a packet data convergence protocol (PDCP) 1314 sublayer, which are terminated at the eNB on the network side. Although not shown, the UE may have several upper layers above the L2 layer 1308 including a network layer (e.g., IP layer) that is terminated at an PDN gateway on the network side, and an application layer that is terminated at the other end of the connection (e.g., far end UE, server, etc.).

The PDCP sublayer 1314 provides multiplexing between different radio bearers and logical channels. The PDCP sublayer 1314 also provides header compression for upper layer data packets to reduce radio transmission overhead, security by ciphering the data packets, and handover support for UEs between eNBs. The RLC sublayer 1312 provides segmentation and reassembly of upper layer data packets, retransmission of lost data packets, and reordering of data packets to compensate for out-of-order reception due to hybrid automatic repeat request (HARQ). The MAC sublayer 1310 provides multiplexing between logical and transport channels. The MAC sublayer 1310 is also responsible for allocating the various radio resources (e.g., resource blocks) in one cell among the UEs. The MAC sublayer 1310 is also responsible for HARQ operations.

In the control plane, the radio protocol architecture for the UE and eNB is substantially the same for the physical layer 1306 and the L2 layer 1308 with the exception that there is no header compression function for the control plane. The control plane also includes a radio resource control (RRC) sublayer 1316 in Layer 3 (L3 layer). The RRC sublayer 1316 is responsible for obtaining radio resources (e.g., radio bearers) and for configuring the lower layers using RRC signaling between the eNB and the UE.

Figure 14:
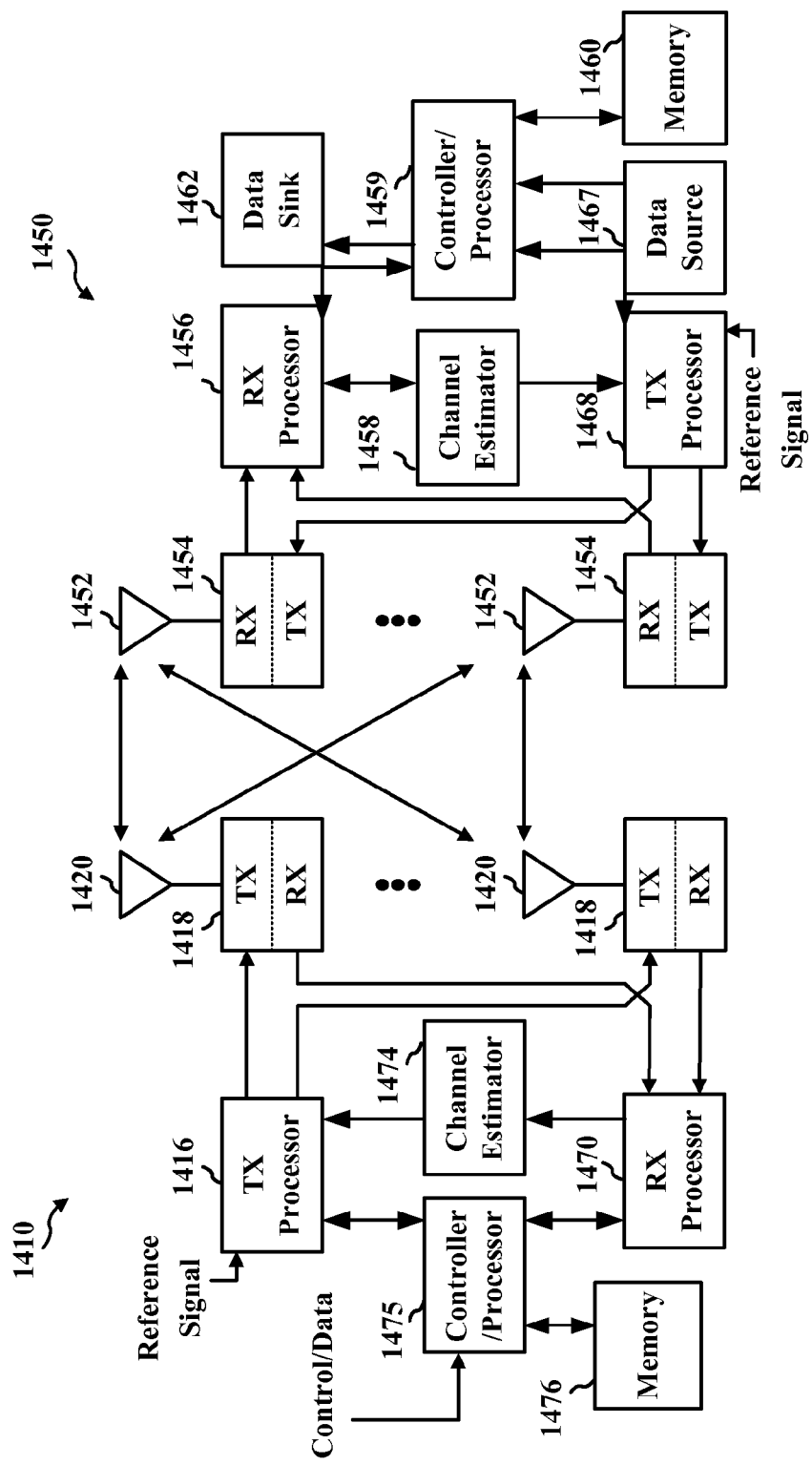
FIG. 14 is a diagram illustrating an example of an eNB and UE in an access network.

FIG. 14 is a block diagram of an eNB 1410 in communication with a UE 1450 in an access network. In the DL, upper layer packets from the core network are provided to a controller/processor 1475. The controller/processor 1475 implements the functionality of the L2 layer. In the DL, the controller/processor 1475 provides header compression, ciphering, packet segmentation and reordering, multiplexing between logical and transport channels, and radio resource allocations to the UE 1450 based on various priority metrics. The controller/processor 1475 is also responsible for HARQ operations, retransmission of lost packets, and signaling to the UE 1450.

The transmit (TX) processor 1416 implements various signal processing functions for the L1 layer (e.g., physical layer). The signal processing functions includes coding and interleaving to facilitate forward error correction (FEC) at the UE 1450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1474 may be used to determine the coding and modulation scheme, as well as for spatial processing. The channel estimate may be derived from a reference signal and/or channel condition feedback transmitted by the UE 1450. Each spatial stream is then provided to a different antenna 1420 via a separate transmitter 1418TX. Each transmitter 1418TX modulates an RF carrier with a respective spatial stream for transmission.

At the UE 1450, each receiver 1454RX receives a signal through its respective antenna 1452. Each receiver 1454RX recovers information modulated onto an RF carrier and provides the information to the receive (RX) processor 1456. The RX processor 1456 implements various signal processing functions of the L1 layer. The RX processor 1456 performs spatial processing on the information to recover any spatial streams destined for the UE 1450. If multiple spatial streams are destined for the UE 1450, they may be combined by the RX processor 1456 into a single OFDM symbol stream. The RX processor 1456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1410. These soft decisions may be based on channel estimates computed by the channel estimator 1458. The soft decisions are then decoded and deinterleaved to recover the data and control signals that were originally transmitted by the eNB 1410 on the physical channel. The data and control signals are then provided to the controller/processor 1459.

The controller/processor 1459 implements the L2 layer. The controller/processor 1459 can be associated with a memory 1460 that stores program codes and data. The memory 1460 may be referred to as a computer-readable medium. In the UL, the control/processor 1459 provides demultiplexing between transport and logical channels, packet reassembly, deciphering, header decompression, control signal processing to recover upper layer packets from the core network. The upper layer packets are then provided to a data sink 1462, which represents all the protocol layers above the L2 layer. Various control signals may also be provided to the data sink 1462 for L3 processing. The controller/processor 1459 is also responsible for error detection using an acknowledgement (ACK) and/or negative acknowledgement (NACK) protocol to support HARQ operations.

In the UL, a data source 1467 is used to provide upper layer packets to the controller/processor 1459. The data source 1467 represents all protocol layers above the L2 layer. Similar to the functionality described in connection with the DL transmission by the eNB 1410, the controller/processor 1459 implements the L2 layer for the user plane and the control plane by providing header compression, ciphering, packet segmentation and reordering, and multiplexing between logical and transport channels based on radio resource allocations by the eNB 1410. The controller/processor 1459 is also responsible for HARQ operations, retransmission of lost packets, and signaling to the eNB 1410.

Channel estimates derived by a channel estimator 1458 from a reference signal or feedback transmitted by the eNB 1410 may be used by the TX processor 1468 to select the appropriate coding and modulation schemes, and to facilitate spatial processing. The spatial streams generated by the TX processor 1468 are provided to different antenna 1452 via separate transmitters 1454TX. Each transmitter 1454TX modulates an RF carrier with a respective spatial stream for transmission.

The UL transmission is processed at the eNB 1410 in a manner similar to that described in connection with the receiver function at the UE 1450. Each receiver 1418RX receives a signal through its respective antenna 1420. Each receiver 1418RX recovers information modulated onto an RF carrier and provides the information to a RX processor 1470. The RX processor 1470 may implement the L1 layer.

The controller/processor 1475 implements the L2 layer. The controller/processor 1475 can be associated with a memory 1476 that stores program codes and data. The memory 1476 may be referred to as a computer-readable medium. In the UL, the control/processor 1475 provides demultiplexing between transport and logical channels, packet reassembly, deciphering, header decompression, control signal processing to recover upper layer packets from the UE 1450. Upper layer packets from the controller/processor 1475 may be provided to the core network. The controller/processor 1475 is also responsible for error detection using an ACK and/or NACK protocol to support HARQ operations.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC.

Additionally, the ASIC may reside in a user terminal. In the alternative, the processor and the storage medium may reside as discrete components in a user terminal.

In one or more aspects, the functions, methods, or algorithms described may be implemented in hardware, software/firmware, or combinations thereof. If implemented in software/firmware, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for aggregating carriers over a backhaul link, comprising:
   determining a first set of subframes of at least a first carrier of a plurality of carriers configured for communicating with an evolved node B (eNB) over a backhaul link;
   determining a second set of subframes of at least a second carrier of the plurality of carriers configured for communicating with the eNB over the backhaul link, wherein the second set of subframes are different from the first set of subframes and wherein the first carrier is different from the second carrier; and
   communicating, by a relay, data received over a plurality of access link carriers from one or more user equipments (UEs) to the eNB over the first carrier and the second carrier based at least on the first set of subframes and the second set of subframes.

2. The method of claim 1, wherein the second set of subframes is a subset of the first set of subframes.

3. The method of claim 1, further comprising determining the first carrier as a primary component carrier based at least in part on determining that the second set of subframes is a subset of the first set of subframes.

4. The method of claim 3, further comprising transmitting acknowledgement/negative acknowledgement (ACK/NAK) on the first carrier for data transmission received on the second carrier.

5. The method of claim 4, further comprising determining a second ACK/NAK transmission timeline for the second carrier based on a first ACK/NAK transmission timeline specified for the first carrier.

6. The method of claim 3, further comprising receiving a downlink grant on the first carrier for data transmission on the second carrier, wherein the downlink grant is received according to a downlink grant transmission timeline for the first carrier.

7. The method of claim 3, further comprising receiving an uplink grant on the first carrier for data transmission on the second carrier, wherein the uplink grant is received according to an uplink grant transmission timeline for the first carrier.

8. The method of claim 3, further comprising:
   receiving an acknowledgement/negative acknowledgement (ACK/NAK) on the first carrier for data transmission on the second carrier; and
   determining a second ACK/NAK receiving timeline for the second carrier based on a first ACK/NAK receiving timeline specified for the first carrier.

9. The method of claim 1, wherein the first carrier uses frequency division duplex (FDD) to provide downlink and uplink communications in one or more of the first set of subframes, and the first carrier is also at least one of the plurality of access link carriers.

10. The method of claim 9, wherein a number of downlink subframes in the first set of subframes is the same as a number of uplink subframes in the first set of subframes for backhaul link communications.

11. The method of claim 9, wherein a number of downlink subframes in the first set of subframes is larger than a number of uplink subframes in the first set of subframes for backhaul link communications.

12. The method of claim 1, wherein the second carrier uses time division duplex (TDD) to provide downlink or uplink communications in a given subframe of the second set of subframes.

13. The method of claim 1, wherein the first carrier is not configured for access link communications, and at least one subframe in the second set of subframes is configured for access link communications.

14. The method of claim 1, further comprising determining a third carrier in the plurality of carriers, wherein the first carrier is configured for backhaul link communications, the second carrier is configured for backhaul link communications and access link communications, and the third carrier is configured for access link communications.

15. An apparatus for aggregating carriers over a backhaul link, comprising:
   means for determining a first set of subframes of at least a first carrier of a plurality of carriers configured for communicating with an evolved node B (eNB) over a backhaul link, and determining a second set of subframes of at least a second carrier of the plurality of carriers configured for communicating with the eNB over the backhaul link, wherein the second set of subframes are different from the first set of subframes and wherein the first carrier is different from the second carrier; and
   means for communicating, by the apparatus, data received over a plurality of access link carriers from one or more user equipments to the eNB over the first carrier and the second carrier based at least on the first set of subframes and the second set of subframes.

16. The apparatus of claim 15, wherein the second set of subframes is a subset of the first set of subframes.

17. The apparatus of claim 15, further comprising means for determining the first carrier as a primary component carrier based at least in part on determining that the second set of subframes is a subset of the first set of subframes.

18. The apparatus of claim 17, wherein the means for communicating receives ACK/NACK feedback and downlink/uplink grants for the second carrier over the first carrier.

19. The apparatus of claim 15, wherein the first carrier uses frequency division duplex (FDD) to provide downlink and uplink communications in one or more of the first set of subframes, and the first carrier is also at least one of the plurality of access link carriers.

20. The apparatus of claim 15, wherein the second carrier uses time division duplex (TDD) to provide downlink or uplink communications in a given subframe of the second set of subframes.

21. A computer program product comprising:
a non-transitory computer-readable medium comprising:
code for causing a computer to determine a first set of subframes of at least a first carrier of a plurality of carriers configured for communicating with an evolved node B (eNB) over a backhaul link;
code for causing the computer to determine a second set of subframes of at least a second carrier of the plurality of carriers configured for communicating with the eNB over the backhaul link, wherein the second set of subframes are different from the first set of subframes and wherein the first carrier is different from the second carrier; and
code for causing the computer to communicate, by a relay, data received over a plurality of access link carriers from one or more user equipments to the eNB over the first carrier and the second carrier based at least on the first set of subframes and the second set of subframes.

22. The computer program product of claim 21, wherein the second set of subframes is a subset of the first set of subframes.

23. The computer program product of claim 21, wherein the computer-readable medium further comprises code for causing the computer to determine the first carrier as a primary component carrier based at least in part on determining that the second set of subframes is a subset of the first set of subframes.

24. The computer program product of claim 23, wherein the code for causing the computer to communicate receives ACK/NACK feedback and downlink/uplink grants for the second carrier over the first carrier.

25. The computer program product of claim 21, wherein the first carrier uses frequency division duplex (FDD) to provide downlink and uplink communications in one or more of the first set of subframes, and the first carrier is also at least one of the plurality of access link carriers.

26. The computer program product of claim 21, wherein the second carrier uses time division duplex (TDD) to provide downlink or uplink communications in a given subframe of the second set of subframes.

27. A wireless communication device for aggregating carriers over a backhaul link, comprising:
a processor;
memory in electronic communication with the processor;
instructions stored in the memory, the instructions being executable by the processor to:
determine a first set of subframes of at least a first carrier of a plurality of carriers configured for communicating with an evolved node B (eNB) over a backhaul link;
determine a second set of subframes of at least a second carrier of the plurality of carriers configured for communicating with the eNB over the backhaul link, wherein the second set of subframes are different from the first set of subframes and the first carrier is different from the second carrier; and
communicate, by the wireless communication device, data received over a plurality of access link carriers from one or more user equipments to the eNB over the first carrier and the second carrier based at least on the first set of subframes and the second set of subframes.

28. The wireless communication device of claim 27, wherein the second set of subframes is a subset of the first set of subframes.

29. The wireless communication device of claim 27, wherein the instructions being executable by the processor to further determine the first carrier as a primary component carrier based at least in part on determining that the second set of subframes is a subset of the first set of subframes.

30. The wireless communication device of claim 29, wherein the instructions being executable by the processor to communicate receive ACK/NACK feedback and downlink/uplink grants for the second carrier over the first carrier.

31. The wireless communication device of claim 27, wherein the first carrier uses frequency division duplex (FDD) to provide downlink and uplink communications in one or more of the first set of subframes, and the first carrier is also at least one of the plurality of access link carriers.

32. The wireless communication device of claim 27, wherein the second carrier uses time division duplex (TDD) to provide downlink or uplink communications in a given subframe of the second set of subframes.

33. An apparatus for aggregating carriers over a backhaul link, comprising:
a carrier assignment receiving component for determining a first set of subframes of at least a first carrier of a plurality of carriers configured for communicating with an evolved node B (eNB) over a backhaul link, and determining a second set of subframes of at least a second carrier of the plurality of carriers configured for communicating with the eNB over the backhaul link, wherein the second set of subframes are different from the first set of subframes and wherein the first carrier is different from the second carrier; and
a backhaul link component for communicating, by the apparatus, data received over a plurality of access link carriers from one or more user equipments to the eNB over the first carrier and the second carrier based at least on the first set of subframes and the second set of subframes.

34. The apparatus of claim 33, wherein the second set of subframes is a subset of the first set of subframes.

35. The apparatus of claim 33, further comprising a primary component carrier (PCC) determining component for determining the first carrier as a PCC based at least in part on determining that the second set of subframes is a subset of the first set of subframes.

36. The apparatus of claim 35, wherein the backhaul link component transmits acknowledgement/negative acknowledgement (ACK/NAK) on the first carrier for data transmission received on the second carrier.

37. The apparatus of claim 36, wherein the backhaul link component determines a second ACK/NAK transmission timeline for the second carrier based on a first ACK/NAK transmission timeline specified for the first carrier.

38. The apparatus of claim 35, wherein the backhaul link component receives a downlink grant on the first carrier for data transmission on the second carrier, wherein the downlink grant is received according to a downlink grant transmission timeline for the first carrier.

39. The apparatus of claim 35, wherein the backhaul link component receives an uplink grant on the first carrier for data transmission on the second carrier, wherein the uplink grant is received according to an uplink grant transmission timeline for the first carrier.

40. The apparatus of claim 35, wherein the backhaul link component receives an acknowledgement/negative acknowledgement (ACK/NAK) on the first carrier for data transmission on the second carrier, and determines a second ACK/NAK receiving timeline for the second carrier based on a first ACK/NAK receiving timeline specified for the first carrier.

41. The apparatus of claim 35, wherein the first carrier uses frequency division duplex (FDD) to provide downlink and uplink communications in one or more of the first set of subframes, and the first carrier is also at least one of the plurality of access link carriers.

42. The apparatus of claim 41, wherein a number of downlink subframes in the first set of subframes is the same as a number of uplink subframes in the first set of subframes for backhaul link communications.

43. The apparatus of claim 41, wherein a number of downlink subframes in the first set of subframes is larger than a number of uplink subframes in the first set of subframes for backhaul link communications.

44. The apparatus of claim 33, wherein the second carrier uses time division duplex (TDD) to provide downlink or uplink communications in a given subframe of the second set of subframes.

45. The apparatus of claim 33, wherein the first carrier is not configured for access link communications, and at least one subframe in the second set of subframes is configured for access link communications.

46. The apparatus of claim 33, wherein the carrier assignment receiving component determines a third carrier in the plurality of carriers, wherein the first carrier is configured for backhaul link communications, the second carrier is configured for backhaul link communications and access link communications, and the third carrier is configured for access link communications.

* * * * *